United States Patent
Seiderman et al.

(10) Patent No.: US 11,783,310 B1
(45) Date of Patent: Oct. 10, 2023

(54) POINT-OF-SALE AUTHORIZATION

(71) Applicant: Block, Inc., San Francisco, CA (US)

(72) Inventors: Corey Seiderman, San Francisco, CA (US); Patrick Belon, San Francisco, CA (US); Kevin Choi, San Francisco, CA (US); Akshay Joglekar, Fremont, CA (US)

(73) Assignee: Block, Inc., Oakland, CA (US)

( * ) Notice: Subject to any disclaimer, the term of this patent is extended or adjusted under 35 U.S.C. 154(b) by 32 days.

(21) Appl. No.: 16/902,671

(22) Filed: Jun. 16, 2020

(51) Int. Cl.
*G06Q 20/20* (2012.01)
*G06Q 20/32* (2012.01)
*G06Q 20/40* (2012.01)

(52) U.S. Cl.
CPC ......... *G06Q 20/206* (2013.01); *G06Q 20/204* (2013.01); *G06Q 20/3278* (2013.01); *G06Q 20/4014* (2013.01)

(58) Field of Classification Search
CPC ........ G06Q 20/00; G06Q 20/20; G06Q 20/14; G06Q 20/202; G06Q 20/40; G06Q 20/10; G06Q 40/02; G06Q 30/0201; G06Q 10/10; G06Q 20/18; G06Q 10/087; G07F 9/001; G07F 7/088; G07F 7/1008; G07F 7/0886
USPC ....... 705/14.51, 30, 39, 17, 44, 27.1, 75, 34; 235/382
See application file for complete search history.

(56) References Cited

U.S. PATENT DOCUMENTS

| | | | |
|---|---|---|---|
| 7,571,468 B1 * | 8/2009 | Williams | H04W 12/126 726/9 |
| 7,647,278 B1 * | 1/2010 | Foth | G06Q 40/00 705/59 |
| 9,734,669 B1 * | 8/2017 | Mullen | G07F 17/329 |
| 9,785,930 B1 * | 10/2017 | Terra | G06Q 20/102 |
| 9,898,733 B1 * | 2/2018 | Perry | G06Q 20/387 |
| 10,043,162 B1 * | 8/2018 | Renke | G06Q 20/405 |
| 10,217,110 B1 * | 2/2019 | Chen | G06Q 20/202 |
| 10,282,536 B1 * | 5/2019 | Freund | G06F 21/35 |
| 10,528,945 B1 * | 1/2020 | Renke | G06Q 20/14 |
| 10,692,140 B1 * | 6/2020 | Kim | G06Q 20/405 |
| 10,748,369 B1 * | 8/2020 | Nakhare | G06K 7/082 |
| 10,796,363 B1 * | 10/2020 | Kim | G06Q 40/03 |
| 10,878,402 B1 * | 12/2020 | Blackie | G06Q 20/204 |
| 10,997,583 B1 * | 5/2021 | Blackie | G07F 9/001 |
| 11,556,936 B1 * | 1/2023 | Fisher | G06Q 20/3226 |
| 2003/0187787 A1 * | 10/2003 | Freund | G06Q 20/346 705/39 |

(Continued)

*Primary Examiner* — Olusegun Goyea
(74) *Attorney, Agent, or Firm* — Lee & Hayes, P.C.

(57) ABSTRACT

Techniques described herein are directed to point-of-sale (POS) authorization and access control. A POS application operating in a first state can send a first instruction to a reader device to prepare to read payment data associated with a payment instrument and, responsive to receiving the payment data from the reader device, can process a transaction using the payment data. In a second state, the POS application can send a second instruction to the reader device to prepare to read non-payment data associated with an identification instrument of a user and, responsive to receiving the non-payment data from the reader device, can verify an identity of the user and/or grant the user permission to perform an operation. The POS application can transition between the first state and the second state based at least in part on a type of instrument to be read by the reader device.

20 Claims, 11 Drawing Sheets

(56) References Cited

U.S. PATENT DOCUMENTS

| | | | |
|---|---|---|---|
| 2004/0210759 A1* | 10/2004 | Fitch | G07G 1/0018 713/186 |
| 2005/0178824 A1* | 8/2005 | Benson | G06Q 20/10 235/380 |
| 2006/0085308 A1* | 4/2006 | Metzger | G07F 7/0886 705/34 |
| 2006/0178986 A1* | 8/2006 | Giordano | G06Q 20/20 705/40 |
| 2006/0224449 A1* | 10/2006 | Byerley | G06Q 30/0226 705/14.27 |
| 2007/0012763 A1* | 1/2007 | Van de Velde | G06Q 20/18 235/382 |
| 2007/0198432 A1* | 8/2007 | Pitroda | G06Q 20/42 705/64 |
| 2008/0015987 A1* | 1/2008 | Ramavarjula | G06Q 40/00 705/44 |
| 2008/0313047 A1* | 12/2008 | Casares | G06Q 20/40 705/17 |
| 2008/0319914 A1* | 12/2008 | Carrott | G06Q 20/38215 705/75 |
| 2009/0008441 A1* | 1/2009 | Montgomery | G07G 1/009 235/379 |
| 2009/0063312 A1* | 3/2009 | Hurst | G06Q 20/206 705/30 |
| 2009/0065572 A1* | 3/2009 | Jain | G06Q 20/401 235/379 |
| 2009/0090783 A1* | 4/2009 | Killian | G06Q 20/3229 235/492 |
| 2009/0192913 A1* | 7/2009 | Saito | G06Q 20/3229 705/26.1 |
| 2009/0228336 A1* | 9/2009 | Giordano | G06Q 40/025 705/75 |
| 2010/0010906 A1* | 1/2010 | Grecia | G06Q 20/405 705/21 |
| 2010/0088188 A1* | 4/2010 | Kumar | G06Q 20/202 705/17 |
| 2010/0174620 A1* | 7/2010 | Stringfellow | G06Q 20/227 705/26.1 |
| 2010/0217674 A1* | 8/2010 | Kean | G07F 7/10 705/17 |
| 2010/0252624 A1* | 10/2010 | Van de Velde | G06Q 20/409 235/382 |
| 2011/0022472 A1* | 1/2011 | Zon | G06Q 20/32 705/14.64 |
| 2011/0087592 A1* | 4/2011 | van der Veen | G06Q 20/227 705/44 |
| 2011/0106659 A1* | 5/2011 | Faith | G06Q 20/40 705/26.41 |
| 2011/0215159 A1* | 9/2011 | Jain | G06Q 20/3227 235/492 |
| 2011/0244796 A1* | 10/2011 | Khan | H04W 4/80 455/41.1 |
| 2011/0251892 A1* | 10/2011 | Laracey | G06Q 20/20 705/16 |
| 2011/0251909 A1* | 10/2011 | Clark | G06Q 20/10 705/17 |
| 2011/0288967 A1* | 11/2011 | Selfridge | G06Q 40/12 705/40 |
| 2011/0320345 A1* | 12/2011 | Taveau | G06Q 20/3265 705/39 |
| 2012/0109764 A1* | 5/2012 | Martin | G06Q 20/20 705/17 |
| 2012/0130787 A1* | 5/2012 | Stouffer | G06Q 30/0238 705/14.1 |
| 2012/0143703 A1* | 6/2012 | Wall | H04L 69/24 705/16 |
| 2012/0209749 A1* | 8/2012 | Hammad | G06Q 20/326 705/27.1 |
| 2012/0254038 A1* | 10/2012 | Mullen | G07F 7/0806 705/44 |
| 2012/0290421 A1* | 11/2012 | Qawami | G06F 21/31 705/21 |
| 2012/0330837 A1* | 12/2012 | Persaud | G06Q 20/20 705/44 |
| 2013/0046643 A1* | 2/2013 | Wall | G06Q 20/3278 705/16 |
| 2013/0103190 A1* | 4/2013 | Carapelli | G07F 9/026 700/237 |
| 2013/0197987 A1* | 8/2013 | Doka | G06Q 30/0229 705/14.28 |
| 2013/0226805 A1* | 8/2013 | Griffin | G06Q 40/02 705/44 |
| 2014/0019340 A1* | 1/2014 | Ruder | G06Q 20/12 705/39 |
| 2014/0150056 A1* | 5/2014 | Williams | G06F 21/83 726/2 |
| 2014/0274320 A1* | 9/2014 | Nguyen | G07F 17/3223 463/25 |
| 2014/0279561 A1* | 9/2014 | Carapelli | G06F 21/83 705/72 |
| 2015/0248664 A1* | 9/2015 | Makhdumi | G06Q 20/3274 235/380 |
| 2015/0363771 A1* | 12/2015 | Graylin | G06Q 20/326 705/65 |
| 2016/0162862 A1* | 6/2016 | Royyuru | G06Q 20/202 705/21 |
| 2016/0189127 A1* | 6/2016 | Amarnath | G06K 19/06037 705/18 |
| 2016/0247141 A1* | 8/2016 | Graylin | G06Q 20/409 |
| 2017/0278096 A1* | 9/2017 | Chitalia | G06Q 20/20 |
| 2018/0005226 A1* | 1/2018 | Terra | G06K 7/0004 |
| 2018/0012211 A1* | 1/2018 | Singhal | G06K 19/06178 |
| 2018/0032850 A1* | 2/2018 | Lee | G06K 7/084 |
| 2018/0211718 A1* | 7/2018 | Heath | G16H 80/00 |
| 2019/0102830 A1* | 4/2019 | Yin | G06Q 20/3276 |
| 2019/0303842 A1* | 10/2019 | Golberg | G06Q 20/202 |
| 2019/0303895 A1* | 10/2019 | Golberg | G06Q 20/202 |
| 2019/0303896 A1* | 10/2019 | Golberg | G06Q 20/20 |
| 2019/0303897 A1* | 10/2019 | Golberg | G06F 16/27 |
| 2019/0303898 A1* | 10/2019 | Golberg | G06F 16/27 |
| 2019/0303899 A1* | 10/2019 | Golberg | G06F 16/27 |
| 2019/0303900 A1* | 10/2019 | Golberg | G06Q 20/3224 |
| 2019/0303901 A1* | 10/2019 | Golberg | G06Q 20/3224 |
| 2019/0303902 A1* | 10/2019 | Sanchez-Llorens | G07G 1/0036 |
| 2019/0303903 A1* | 10/2019 | Sanchez-Llorens | G06Q 20/203 |
| 2019/0303904 A1* | 10/2019 | Sanchez-Llorens | G06Q 20/203 |
| 2019/0303905 A1* | 10/2019 | Sanchez-Llorens | G07G 1/01 |
| 2019/0303937 A1* | 10/2019 | Sanchez-Llorens | G07G 1/0036 |
| 2019/0303938 A1* | 10/2019 | Sanchez-Llorens | G06Q 20/405 |
| 2020/0019955 A1* | 1/2020 | Lee | G06Q 20/3278 |
| 2020/0201985 A1* | 6/2020 | Cat | G06F 21/53 |
| 2020/0202327 A1* | 6/2020 | Cat | G06Q 20/352 |
| 2020/0202347 A1* | 6/2020 | Cat | G06Q 20/20 |
| 2020/0380489 A1* | 12/2020 | Saitoh | G06Q 20/405 |
| 2020/0402036 A1* | 12/2020 | Doka | G06Q 20/202 |
| 2021/0358164 A1* | 11/2021 | Liu | G06V 10/764 |

\* cited by examiner

POINT-OF-SALE AUTHORIZATION

TECHNICAL FIELD

Access control solutions offer protections to merchants, for instance, by tracking movement of employees and/or controlling operations that are performable by employees. Conventional access control solutions often use personal identification numbers (PINs) which only individuals know for authorization of various operations. When prompted, an individual can provide a PIN to verify their identity and obtain authorization to perform a particular operation. However, PINs can be guessed, stolen, shared, etc. As such, while PINs are helpful, they do not provide fail-safe access control solutions.

BRIEF DESCRIPTION OF THE DRAWINGS

Features of the present disclosure, its nature and various advantages, will be more apparent upon consideration of the following detailed description, taken in conjunction with the accompanying drawings.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
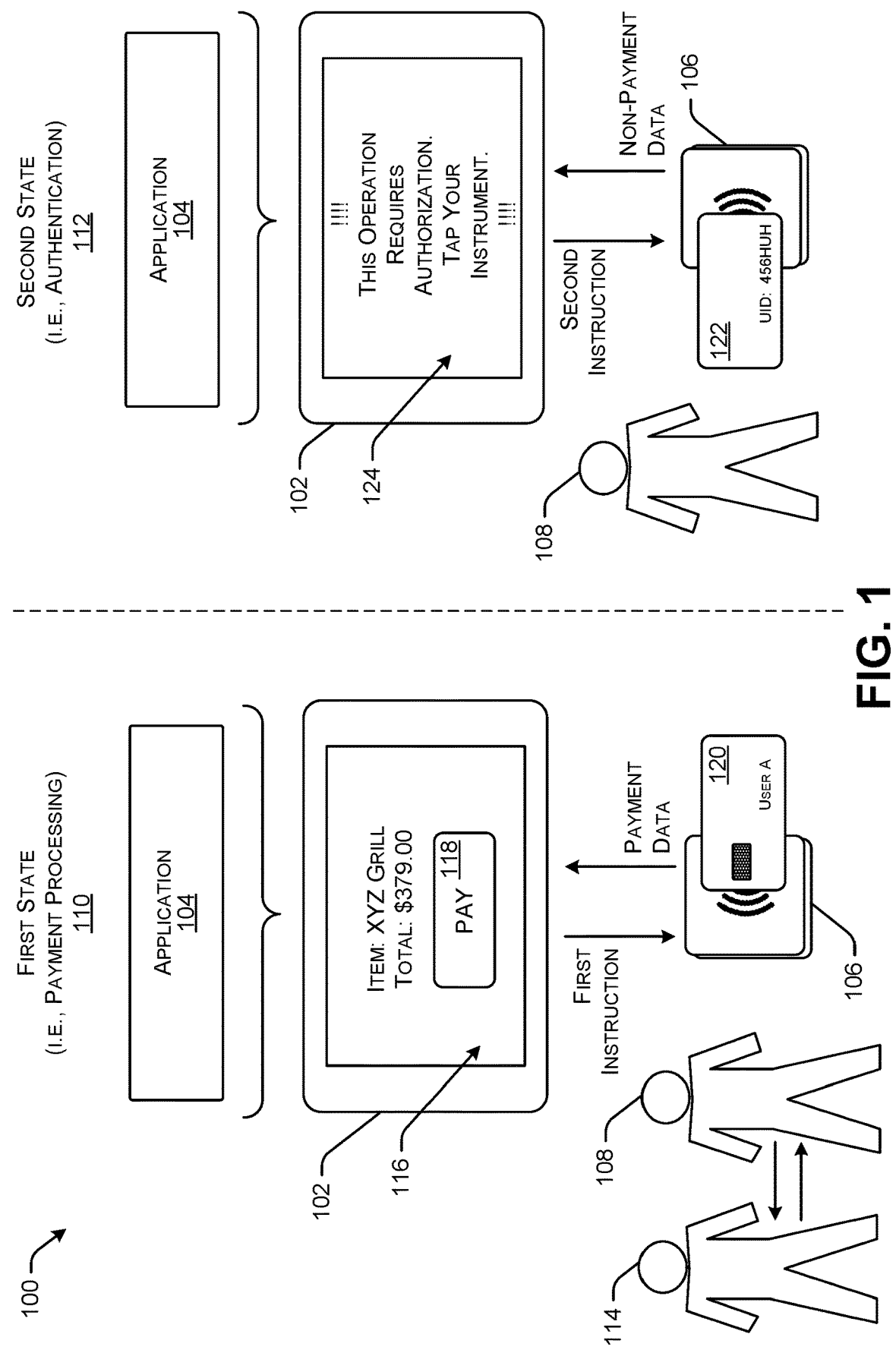
FIG. 1 illustrates an example environment for point-of-sale authorization using an application that can transition between different states depending on a type of instrument to be read, as described herein.

Techniques described herein are directed to authorization using point-of-sale (POS) systems, or components associated therewith. Merchants often use specially configured POS systems for processing payments for transactions. In some examples, the specially configured POS systems, or portions thereof, can be provided by a service provider that processes payments on behalf of the merchants (e.g., via a payment processing service). In an example, a specially configured POS system of a merchant can utilize a POS application that configures a computing device to communicate with a reader device coupled to the computing device. The reader device can read payment data from payment instruments and transmit the payment data to the POS application. The POS application can transmit the payment data with transaction data to remotely located server(s) associated with the service provider to process payments on behalf of the merchant.

In some examples, the reader device can be configured to read non-payment data in addition to the payment data, as described above. That is, in some examples, the POS application can send an instruction to the reader device to configure the reader device to read non-payment data from an instrument (e.g., a radio-frequency identification (RFID) card, a wearable device, a fob, etc.). Such non-payment data can be used for determining an identity of a user—such as an employee of the merchant—and/or determining which operation(s) the user is authorized to perform. That is, the POS application can transition between different states to configure the reader device to read different types of data (e.g., payment data or non-payment data), thereby enabling the merchant to utilize the specifically configured POS system for processing payments and/or performing non-payment actions, such as authorizations. For the purpose of this discussion, "authorization" can refer to any process associated with determining an identity of a user, verifying an identity of a user, and/or permitting a user to perform an operation based on identifying and/or verifying the identity of the user.

As an example, an employee can attempt to clock-in for timekeeping purposes (e.g., at a start of a shift, after a break during a shift, etc.). A POS application associated with a computing device can prompt the employee for an identifier of the employee and/or to verify the identity of the employee, for example via a user interface. In at least one example, the employee can be associated with an identification instrument, such as a RFID card that is associated with a unique identifier. The employee can cause the RFID card to interact with a reader device coupled to the computing device. That is, the employee can use the RFID card to perform a dip, tap, or swipe so that the reader device can read data associated with the RFID card. In some examples, the POS application can have sent an instruction to the reader device to cue the reader device to prepare to read the non-payment data associated with the RFID card, which can cause the reader device to activate an antenna (and in some examples, a particular frequency band for reading non-payment data) and encrypt received data using a particular encryption process. The reader device can send the data read from the RFID card to the POS application. The data can then be used to determine and/or verify an identity of the employee. In some examples, such data can be compared with a personal identification number (PIN), or other means for identifying the employee, to verify the identity of the employee, and the POS application can authorize the employee to clock-in. In some examples, if the employee is associated with more than one job title, the application can present a notification for the employee to select which job title applies to a current shift. In some examples, such information can be utilized by a payroll service for determining a compensation rate associated with the current shift. Additionally, in some examples, responsive to the employee clocking-in, the application can access permission(s) associated with the employee and can store the permission(s), at least temporarily, to enable the employee to perform various permissioned operations without having to authorize the employee each time the employee requests to perform a permissioned operation.

As another example, an employee can request to perform an operation associated with a transaction, such as a refund or a cancellation of the transaction. Such operations are often associated with fraudulent behavior and can require authorization. A POS application associated with a computing device can prompt the employee for an identifier of the employee (e.g., to determine whether the employee is permitted to perform the operation), for example via an authorization user interface. In at least one example, the employee can be associated with an identification instrument, such as a RFID card that is associated with a unique identifier. The employee can cause the RFID card to interact with a reader device coupled to the computing device. That is, the employee can use the RFID card to perform a dip, tap, or swipe so that the reader device can read data associated with the RFID card. The reader device can send the data read from the RFID card to the POS application. The data can then be used to determine and/or verify an identity of the employee, access permission(s) associated with the employee, and determine whether the employee is authorized to perform the operation based on the permission(s). In some examples, such data can be compared with a PIN, or other means for identifying the employee, to verify the identity of the employee.

In some examples, multiple employees can be using a same computing device during a same period of time (e.g., employees of a restaurant, retail store, etc.). In such examples, employees can tap their identification instruments to the reader device, or otherwise cause their identification instruments to interact with the reader device, to provide an identifier associated with individual operations. In such examples, the POS application and/or service provider can track operations performed by individual employees during their shifts. In some examples, such information can be used for tracking appointments, determining payroll, determining tips, determining fraudulent behavior, determining performance, determining trends such as sales trends, or the like.

As described above, access control solutions offer protections to merchants, for instance, by tracking movement of employees and/or controlling operations that are performable by employees. Conventional access control solutions often use PINs which only individuals know. When prompted, an individual can provide a PIN to verify their identity and obtain permission to perform a particular operation. However, PINs can be guessed, stolen, shared, etc. As such, while PINs are helpful, they do not provide fail-safe access control solutions. Some existing access control solutions utilize PINs and cards or fobs for an additional layer of verification. However, such access control solutions require card readers to read such cards or fobs, and if merchants accept card payments, such merchants require additional card readers to read payment cards. That is, existing techniques require multiple reader devices because payment reader devices are not configured to read non-payment data and non-payment reader devices are not configured to read payment data. Or, to the extent magstripe readers are configured to read multiple types of instruments, such magstripe readers use the same communication channel and do not treat the instruments differently (e.g., from encryption to communication, etc.).

Techniques described herein enable merchants to use hardware that is configured to read both payment data (e.g., associated with payment cards or other payment instruments) and non-payment data (e.g., associated with identification cards or other identification instruments) and differentiate between two flows (e.g., payment vs. non-payment) based on the nature of the instrument (e.g., payment vs. non-payment) that is interacting with such reader device hardware. That is, in some examples, techniques described herein enable merchants to use a single reader device for obtaining different types of data from different types of instruments. As such, techniques described herein offer an improvement to existing technology because fewer devices, and thus resources, are needed to perform access control operations and/or payment processing as described herein. Moreover, techniques described herein offer improvements to verification by offering additional or alternative mechanisms for ensuring that an employee is who they say they are and/or identification by offering additional or alternative mechanisms for an employee to identify themselves in association with an operation.

In existing technologies, payment reader devices, such as NFC reader devices (e.g., reader devices configured with NFC protocols), are not configured to read different types of data. That is, such payment reader devices are configured to read payment data from payment instruments. To perform techniques described herein, a reader device can be specially configured to read different types of data. For instance, as described herein, a reader device can have an antenna that can be configured to service multiple frequency bands (which can correspond to different types of data to be read) or multiple antennas that can each be configured to service a different frequency band. Further, a reader device can be configured to receive instructions regarding different types of data to be obtained and can (i) prioritize such instructions and/or (ii) determine how to handle (e.g., encrypt) received data based on the instructions. As such, a reader device can be configured to read different types of data using different frequency bands, and such data can be transmitted to an application, such as a POS application, on a computing device for payment processing, non-payment actions, such as authorizations, and the like. In some examples, such configurations can be retrofitted into existing POS hardware through firmware modifications. The configurations can be made prior to any transactions or other actions performed using POS hardware. Additionally or alternatively, such configurations can be triggered after a new instrument, e.g., a non-payment instrument, is swiped, dipped, tapped or otherwise engaged with a reader device. Thus, introduction of a new type of instrument (e.g., non-payment instrument) can trigger the reader device to generate a request to configure the reader device to accept the new type of instrument. In some examples, the merchant can be alerted to the request on a merchant device and/or can be provided instructions to register the new type of instrument and the reader flow to follow for that instrument, such as setting access controls, assigning to a user, etc.

In addition to modifications to existing reader device technologies, techniques described herein can modify traditional payment flows. That is, in existing technologies, when a merchant desires to obtain payment for a transaction, the merchant can interact with a user interface, which can cause a POS application to prompt the reader device to prepare to read payment data from a payment instrument. Upon receiving the payment data, the reader device can send the payment data to the POS application and the POS application can process payment for the transaction, via a connection with remotely located server(s) associated with a service provider that can process payments via a payment processing service. However, techniques described herein enable the POS application to transition between different states, based on a determination of which type of data is to be obtained (e.g., from different types of instruments), and send different instructions to the reader device to prompt the reader device to prepare to read the relevant type of data. That is, the POS application can utilize a reader device with different flows to obtain different types of data, which can be associated with different states, and accordingly the data can be partitioned off in different areas of the memory depending on the state in which the reader device is currently operating, for example the payment data can be logically separated from the non-payment data. In some examples, such modifications cause reader devices to activate at times that reader devices would not otherwise activate (e.g., at some time when a payment flow is not in process or a particular payment user interface is not being presented). Such techniques, however, can otherwise be integrated into existing payment flows using existing hardware—both with modifications—to provide secure, scalable authorization mechanisms.

In at least one example, techniques described herein can utilize machine-trained models to generate recommendations, for example, with respect to authorization processes. For example, the service provider described above can provide services to a plurality of merchants, which can be connected via a network of specially configured devices (e.g., computing devices associated with instances of an application configuring the computing device to perform certain operations, as described below, and communicate with server(s) associated with the service provider). In at least one example, at least some of the merchants can utilize authorization services as described herein. In some examples, the service provider can obtain data associated with such merchants and their use of the authorization services. For instance, the service provider can obtain data indicating a number of RFID cards purchased and/or used by individual merchants, which operations are associated with permissions for individual merchants, and the like. The service provider can analyze such data—for instance using machine-trained model(s)—to determine recommendations. Such recommendations can be provided to new merchants (e.g., merchants onboarding to obtain services provided by the service provider), existing merchants, or the like. That is, techniques described herein can intelligently determine a number of RFID cards purchased and/or used by individual merchants, which operations are associated with permission(s) for individual merchants, and the like. Such techniques enable a customized and/or personalized approach to setting up and/or using authorization services, which is an improvement over existing one-size-fits-all techniques.

Additional improvements are described below with reference to FIGS. 1-11.

FIG. 1 illustrates an example environment 100 for POS authorization using an application that can transition between different states depending on a type of instrument to be read, as described herein. The example environment 100 illustrates a user computing device 102, which can have an application 104 installed thereon. In some examples, the user computing device 102 can comprise one or more components, such as a customer-facing component and a merchant-facing component. In some examples, the user computing device 102 can be a single computing device 102 that is rotatable or otherwise movable to allow merchants and/or customers to interact with the user computing device 102.

The application 104 can be a desktop application, a web browser application, or a dedicated application (e.g., provided by a service provider, provided by a third-party, etc.). In at least one example, the application 104 can specially configure the user computing device 102 as a POS terminal for processing transactions, and performing other operations (e.g., authorizations, etc.). As such, in some examples, the application 104 can be referred to as a "POS application." In at least one example, the application 104 can configure the user computing device 102 to exchange data with a reader device 106 that can be coupled to the user computing device 102 and/or with server computing device(s) (e.g., server(s)) associated with a service provider (e.g., described below with reference to FIG. 2)). In at least one example, the reader device 106 can be communicatively coupled to the user computing device 102, for example, via a wired or wireless connection. The reader device 106 can be configured to read data from instruments, for example via dips, taps, swipes, or other interactions. Additional details associated with the reader device 106, and dips, taps, swipes, or other interactions are described below. In at least one example, the application 104 can present graphical user interfaces (GUIs) and/or otherwise present data to enable users, such as the user 108, to interact with the user computing device 102 for accessing functionality and/or services as described herein.

In at least one example, the application 104 can transition between different states, as illustrated in FIG. 1. In a first state 110, the application 104 can facilitate payment processing. In a second state 112, the application 104 can facilitate a non-payment action, such as authorization of a user or user computing device 102. In at least one example, the application 104 can transition between the first state 110 and the second state 112 depending on which type of data and/or instrument is to be obtained from the reader device 106. That is, based at least in part on detecting a type of data and/or instrument to be obtained from the reader device 106, the application 104 can transition between different states as described above. Of course, the application 104 can transition between additional or alternative states than those described herein.

In the first state 110, the user 108 can be an employee, agent, etc. associated with a merchant. The user 108 can perform a transaction with a customer 114, for example, where the customer 114 purchases (or otherwise acquires) an item (e.g., a good or a service) from the user 108. In at least one example, the customer 114 can provide a payment for the item. As described above, in some examples, merchants can utilize services provided by a payment processing service to process payments for transactions. In such an example, the application 104 can be provided by a service provider with which the payment processing service is associated. In at least one example, when the user 108 desires to obtain payment for the transaction, the user 108 can interact with a payment user interface, such as the payment GUI 116, to initiate a payment. For example, the user 108 can interact with the control 118 (e.g., via a touch input, mouse input, spoken input, etc.) to initiate a payment flow for processing payment for the transaction.

In at least one example, based at least in part on the user 108 actuating the control 118, the application 104 can receive the input and send a first instruction to the reader device 106. The first instruction can prompt the reader device 106 to prepare to read payment data from a payment instrument. In some examples, the reader device 106 can activate an antenna (which can otherwise be off to conserve battery power, for example) and can configure the antenna for servicing a first frequency band associated with reading payment data from a payment instrument via a secure communication channel. The reader device 106 can wait a designated period of time for a payment instrument to move within a threshold distance of the reader device 106 to read payment data from the payment instrument. In some examples, the threshold distance can be based on a communication protocol facilitating the transmission of the payment data from the payment instrument to the reader device 106. For example, in at least one example, near-field communication (NFC) protocols can be used for facilitating such a transmission when the customer 114 "taps" his or her payment instrument 120 with the reader device 106 (or otherwise hands over the payment instrument to the user 108 to tap with the reader device 106). In other examples, the customer 114 and/or user 108 can dip the payment instrument 120, swipe the payment instrument 120, or otherwise cause the payment instrument 120 to move within a threshold distance of the reader device 106 such that the reader device 106 can read payment data associated with the payment instrument 120.

In at least one example, upon receiving the payment data, the reader device 106 can send the payment data to the application 104. In some examples, the reader device 106 can encrypt the payment data prior to sending the payment data to the application 104. In at least one example, the application 104 can process payment for the transaction, via a connection with remotely located server(s) associated with a service provider offering the payment processing service. That is, the application 104 can associate the payment data with transaction data, which can indicate point-of-purchase data associated with the transaction, and can send the transaction data (e.g., including the payment data) to the remotely located server(s) for processing the payment, as described in additional detail below.

In the second state 112, the user 108 can be an employee, agent, etc. associated with a merchant. In case of multiple merchant locations, the employee, agent, etc. may be associated with a location different from the location where user computing device 102 is physically located. In at least one example, the user 108 (e.g., a user profile associated therewith) can be associated with an identification instrument 122, such as an RFID card that is associated with a unique identifier. Additional details associated with the identification instrument 122 are provided below with reference to FIG. 2. While the identification instrument 122 is described herein as being an RFID card, in additional or alternative examples, the identification instrument 122 can be a card associated with a Quick Response (QR) code, coupon, barcode, or the like. In examples where the identification instrument 122 is such a card, another type of non-payment flow can be initiated by the application 104 to cause the reader device 106 to read data associated therewith.

In at least one example, the user 108 can request to perform an operation. In some examples, the operation can be associated with a transaction, such as a refund or a cancellation of the transaction. In some examples, such operations can be associated with fraudulent behavior and, thus, merchants can require additional permissions to perform such operations. In some examples, the operation can be associated with employee management, such as clocking-in, logging-in, or the like. In some examples, another user associated with the merchant can request to perform an operation that requires the approval of the user 108. For example, the user 108 can be a manager and certain operations can require manager approval (e.g., refunds, cancellations, voids, etc.). In some examples, an operation can be associated with an override operation, wherein the user 108 is overriding a default operation.

In at least one example, the application 104 can receive the request to perform the operation, initiate changes in the process flow such that payment processing actions are temporarily suspended or paused, and can present an authorization user interface, such as the authorization GUI 124, to notify the user 108 that permission is required to perform the requested operation and prompt the user 108 for an identifier of the user 108 (e.g., to determine whether the user 108 is authorized to perform the operation). In at least one example, based at least in part on receiving the request and presenting the authorization GUI 124, the application 104 can send a second instruction to the reader device 106. The second instruction can prompt the reader device 106 to prepare to read non-payment data from an identification instrument. In some examples, the reader device 106 can activate an antenna (which can otherwise be off to conserve battery power, for example) and can configure the antenna for servicing a second frequency band associated with reading non-payment data from an identification instrument via a secure communication channel. In some examples, the second frequency band can be the same as the first frequency band. In some examples, the second frequency band can be different than the first frequency band. In some examples, a second antenna can be provisioned for configuring the reader device 106 to operate in the second state 112 (e.g., a non-payment state), to allow the communication between the reader device 106 and the merchant device 102 to happen over a communication channel separate from and different than the secure and encrypted channel on which payment data may be transmitted. In such an example, depending on the nature of the request (e.g., on parsing the request and determining it to be for non-payment data, such as an identifier number, employee identifier, etc.), the reader device 106 can be directed to activate the second antenna, while keeping the first antenna (e.g., configured for reading payment data) disabled, or activated, but solely for accepting payment instruments. In some examples, instead of using an antenna with different frequency bands and/or antennas with different frequency bands, the reader device 106 can configure the antenna using a protocol associated with reading non-payment data from an identification instrument via a secure communication channel instead of, or in addition to, a protocol associated with reading payment data from payment instruments. In such examples, firmware modifications can be made to accommodate these protocols.

The reader device 106 can wait a designated period of time for an identification instrument to move within a threshold distance of the reader device 106 to read non-payment data from the identification instrument. In some examples, the threshold distance can be based on a communication protocol facilitating the transmission of the non-payment data from the identification instrument to the reader device 106. For example, in at least one example, NFC protocols can be used for facilitating such a transmission when the user 108 "taps" his or her identification instrument 122 with the reader device 106. In other examples, the user 108 can dip the identification instrument 122, swipe the identification instrument 122, or otherwise cause the identification instrument 122 to move within a threshold distance of the reader device 106 such that the reader device 106 can read non-payment data associated with the identification instrument 122.

In both payment and non-payment examples, the reader device 106 can wait a designated period of time after which, if data has not been read, the reader device 106 can return an error message or other indication that the data was not read. In some examples, the reader device 106 can turn off the antenna(s) after such a designated period of time has lapsed.

In at least one example, upon receiving the non-payment data, the reader device 106 can send the non-payment data to the application 104 and the application 104 can access a database or other data store storing rules that can be used to determine (i) an identity of the user 108 and/or (ii) whether the user 108 is authorized to perform the requested operation. That is, the non-payment data can be used to determine an identity of the user 108, access permission(s) associated with the user 108, and determine whether the user 108 is authorized to perform the operation. In some examples, the application 104 can access stored user data to determine (i) the identity of the user 108 and/or (ii) whether the user 108 is authorized to perform the requested operation. In other examples, the application 104 can transmit the non-payment data via a connection with remotely located server(s) associated with the service provider for determining (i) the identity of the user 108 and/or (ii) whether the user 108 is authorized to perform the requested operation (in which case, the application 104 can receive an indication whether the user 108 is authorized to perform the requested operation). In some instances, the application 104 can access server computing device(s) to access data from other merchant locations to determine access controls and permissions.

In some examples, an additional GUI can be presented via the user computing device 102 which can prompt the user 108 to enter a PIN, or other identifying data, that is specific to the user 108. In such examples, the non-payment data can be compared with the PIN, or other identifying data, to verify the identity of the user 108 and/or determine whether the user 108 is authorized to perform the requested operation.

Figure 2:
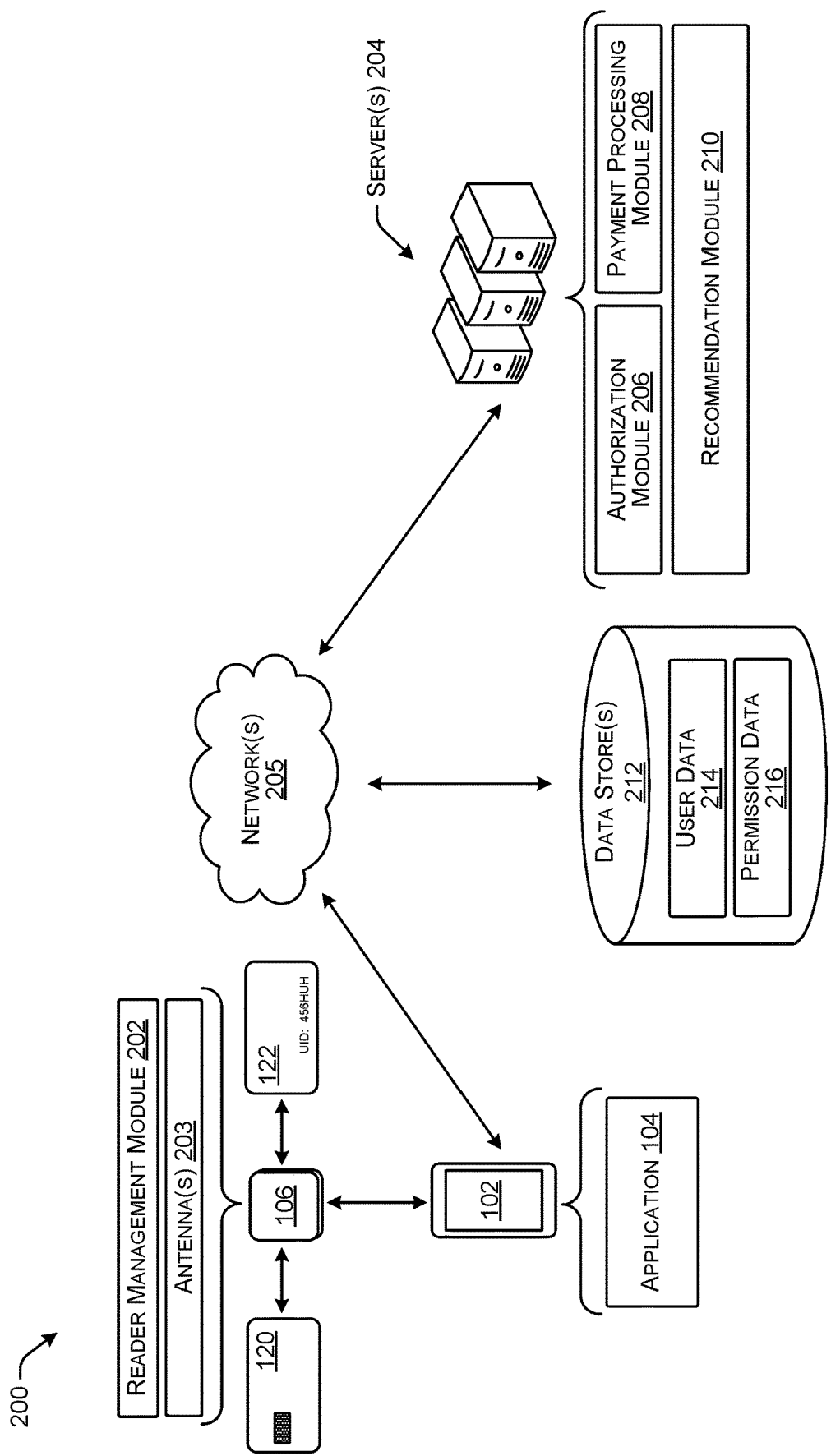
FIG. 2 illustrates an example environment for point-of-sale authorization, as described herein.

FIG. 2 illustrates an example environment 200 for POS authorization, as described herein. The example environment 200 can include the user computing device 102, which can be coupled to at least one reader device 106, as described above with reference to FIG. 1.

The user computing device 102 can be connectable to or otherwise be coupled to a reader device 106, for reading payment instruments, such as the payment instrument 120, and/or identifiers associated with identification instruments, such as the identification instrument 122. In some examples, as described above, the reader device 106 can plug in to a port in the user computing device 102, such as a microphone port, a headphone port, an audio-jack, a data port, or other suitable port. In additional or alternative examples, the reader device 106 can be coupled to the user computing device 102 via another wired or wireless connection, such as via a Bluetooth®, BLE, and so on. In some examples, the reader device 106 can include a read head for reading a magnetic strip of a payment card, and further can include encryption technology for encrypting the data read from the magnetic strip. Additionally or alternatively, the reader device 106 can be a Europay, Mastercard, and Visa (EMV) or NFC reader device, which in some examples, can be embedded in the user computing device 102, or can be communicatively coupled to the user computing device 102. Moreover, numerous other types of readers can be employed with the user computing device 102 herein, depending on the type and configuration of the user computing device 102. For instance, in some examples, the reader device can be integrated into the user computing device 102.

In some examples, the reader device 106 can be a portable magnetic stripe card reader, optical scanner, smartcard (e.g., card with an embedded IC chip) reader (e.g., an EMV-compliant card reader or NFC-enabled reader), RFID reader, or the like, configured to detect and obtain data off an instrument. Accordingly, the reader device 106 can include hardware implementation, such as slots, magnetic tracks, and rails with one or more sensors or electrical contacts to facilitate detection and acceptance of an instrument, such as the payment instrument 120 and/or identification instrument 122, described above with reference to FIG. 1. That is, the reader device 106 can include hardware implementations to enable the reader device 106 to interact with an instrument via a swipe (i.e., a card-present transaction where a user slides an instrument having a magnetic strip through a reader device that captures data contained in the magnetic strip), a dip (i.e., a card-present transaction where a user inserts an instrument having an embedded microchip (i.e., chip) into a reader device first until the reader device prompts the user to remove the card), or a tap (i.e., a card-present transaction where a user can tap or hover his or her instrument (e.g., a card, a smart phone running an application, etc.) over a reader device to complete a transaction via short-range communication) to obtain data associated with the instrument. Additionally or optionally, the reader device 106 can also include a biometric sensor to receive and process biometric characteristics and process them as instruments, given that such biometric characteristics are registered with the service provider.

The reader device 106 can include a reader management module 202 for performing various functions as described herein. Furthermore, the reader device 106 can also include one or more antennas 203. At least one antenna 203 embedded therein can be configurable to receive payment information from the payment instrument 120. Additionally, the same antenna, or alternatively a different antenna embedded in the reader device 106, can inductively couple to an antenna in the identification instrument 122 (e.g., RFID instrument or NFC instrument) to obtain information from the non-payment instrument. The reader device 106 can operate on low-frequency bands (125 kHz or 134 kHz), high-frequency bands (HF, 13.56 MHz), and/or ultra-high-frequency bands (UHF, 860-960 MHz) through switching between the antenna(s) 203 or by configuring the reader device 106 in a specific frequency band based on the type of instrument detected at the reader device 106, or provided as an input through the application 104. For example, the reader device 106 may leverage lower transmit and receive carrier frequencies to perform wireless communication for non-payment instruments (e.g., the identification instrument 122), and higher transmit and receive carrier frequencies for payment instruments (e.g., the payment instrument 120), while keeping the same RFID/NFC circuitries. Similar configurations can be made if the reader device 106 is an EMV reader, magnetic stripe reader, biometric reader and so on. Additional details associated with the reader device 106 are provided below.

While, the user computing device 102, which can be a POS terminal, and the reader device 106 are shown as separate devices, in additional or alternative examples, the user computing device 102 and the reader device 106 can be part of a single device, which can be a battery-operated device, as described above. In such an example, components of both the user computing device 102 and the reader device 106 can be associated with the single device. In some examples, the reader device 106 can have a display integrated therewith, which can be in addition to (or as an alternative of) a display associated with the user computing device 102.

In at least one example, an instrument can be associated with a unique identifier that can be associated with a user and thus can be utilized for authorization, as described herein. In at least one example, such an instrument can be called an "identification instrument," such as the identification instrument 122 described above with reference to FIG. 1. In at least one example, the identification instrument 122 can be a card that complies with protocols established by the International Organization for Standardization (ISO) 14443 or ISO 7816. The identification instrument 122 is shown as such an RFID card; however, an identification instrument can be any instrument that is associated with a unique identifier that can be (i) read by the reader device 106 and (ii) is associated with a user. For instance, an identification instrument can be a wearable device, a fob, a payment instrument, etc.

In at least one example, the identification instrument 122 can comprise RFID technology. That is, the identification instrument 122 can include an RFID tag that includes an RFID chip for storing and processing information, modulating and demodulating the RF signal, etc., and an antenna for receiving and transmitting the signal. RFID tag can optionally include a battery to constantly or on activation broadcast a signal, and thereby indicate its presence.

The identification instrument 122 can be a magnetic stripe, EMV, biometric or NFC card. In all cases, the reader device 106 can receive an activation signal either through contact or contactless means and accordingly, a unique communication session can be opened with respect to each kind of instrument, payment (e.g., the payment instrument 120) or non-payment (e.g., the identification instrument 122).

In at least one example, the identification instrument 122 can be associated with non-payment data. The non-payment data can include an identifier that is unique to the identification instrument 122 (e.g., UID). In at least one example, the identifier can be stored on a memory chip of an RFID tag or other identification instrument. In some examples, the identifier can be associated with the identification instrument 122 when the identification instrument 122 is purchased from such a supplier of the identification instrument 122. In some examples, the merchant or service provider can associate the identifier with the identification instrument 122.

The identifier can be associated with a user, such as the user 108. For example, the user 108, or the merchant, can interact with the application 104 to request to activate an identification instrument, such as the identification instrument 122. The application 104 can request data identifying the user 108 (e.g., a user identifier, a user name, a birthdate, a phone number, an email address, a PIN, a biometric identifier, an employee identifier, etc.) and can prompt the user 108, or the merchant, to tap (or dip, swipe, etc.) the identification instrument to the reader device 106. The reader device 106 can read non-payment data associated with the identification instrument, which can include the identifier, and send the non-payment data to the application 104. The application 104 can send the non-payment data, including the identifier, to remotely located server(s) associated with a service provider and the server(s), as described below, can associate the identifier with a profile of the user. That is, the identifier can be mapped to, or otherwise associated with, the profile of the user 108. Identifiers can be associated with user profiles via alternative mechanisms as well. For instance, the user 108, or the merchant, can interact with a GUI (e.g., associated with a dashboard) to provide data identifying the user 108 and the identifier associated with the identification instrument with a request to associate the identifier with the user profile of the user. Identifiers can be disassociated with user profiles via the same or similar processes as described above.

In some examples, the identification instrument 122 can be associated with additional or alternative data. For example, in at least one example, the identification instrument 122 can be associated with the funds (e.g., associated with an account maintained by the service provider or linked to another account), loyalty data, rewards data, or the like. For instance, in some examples, the user 108 can receive payroll payments, tips, or other compensation from the merchant (or another employer) and such funds can be stored in an account maintained by the service provider. The identification instrument 122 can include an account identifier or the user profile of the user 108 can be linked to the account, such that the user 108 can use the identification instrument 122 for payment in some transactions. Further, in some examples, the user 108 can use the identification instrument 122 for redeeming rewards and/or receiving rewards in some transactions.

In some examples, the identification instrument 122 can be provided by an employer to an employee for authorization of operations performed by the employee on behalf of the employer. In some examples, the identification instrument 122 can be used for different employers, different merchants, etc. In some such examples, the service provider can provide the identification instrument 122 to the employee for authorization of operations performed by the employee on behalf of different employers, different merchants, etc.

In some instances, the reader device can accept 106 both payment instrument 120 and identification instrument 122 at the same time. For example, the payment instrument can 120 can be swiped while the identification instrument 122 is tapped. For such scenarios, the reader device 106 and terminal 102 can initiate a collision detection and resolution method to resolve priority of one instrument over another. A collision detection and resolution method (which can also be called an "anti-collision" method) defines what happens when multiple instruments enter a operating field of the reader device 106 at the same time, identifying how the reader device 106 determines which instrument to use in the transaction, and ensuring that all instruments presented are inventoried and processed.

A collision detection and resolution method involves investigating the presence of multiple instruments in the operating field of the reader device 106. An instrument polling sequence initiated by the reader device 106 polls and awaits responses from instruments that may be present in the operating field of the reader device 106. If more than one type of instruments is supported by the reader device 106, the polling sequence includes wake-up commands for all supported types of instruments.

In at least one example, a non-payment instrument (e.g., the identification instrument 122) can be prioritized over a payment instrument (e.g., the payment instrument 120), such that when both instruments are detected at the same time, the reader device 106 can resort to exception processing. In such an example, the communication session created with respect to the payment instrument can be either halted or suspended and as such processing of the transaction through the payment instrument is halted or suspended. In such an example, a new communication session can be created to handle the non-payment instrument.

In another example, both instruments can be configured to parallelly and independently have established communication sessions with the reader device 106. The reader device 106 may activate a communication session with each of the instruments using activation commands appropriate to the identified type of instrument. After a transaction with an identified instrument has been processed, the instrument can be deactivated and removed. This can be made possible if both the instruments operate on different, even if slightly, frequency bands.

The user computing device 102 can communicate with one or more server computing devices (e.g., server(s) 204) via one or more networks (e.g., network(s) 205). In at least one example, the network(s) 205 can include the Internet, cable network(s), cellular network(s), cloud network(s), wireless network(s) (e.g., Wi-Fi) and wired network(s), as well as close-range communications such as Bluetooth®, Bluetooth® low energy (BLE), and the like. Additional details associated with each of the components described in FIG. 2 are described below with reference to FIGS. 9 and 10. While a single user computing device 102 is illustrated in FIG. 2, the example environment 200 can include multiple (e.g., tens, hundreds, thousands, millions, etc.) user computing devices.

In at least one example, the server(s) 204 can include one or more functional components. Functional components can comprise instructions or programs that are executable by processor(s) associated with the server(s) 204 to implement operational logic for performing the actions and services attributed above to the server(s) 204. In at least one example, the functional components can include an authorization module 206, a payment processing module 208, and a recommendation module 210.

In at least one example, the authorization module 206 can receive non-payment data (e.g., an identifier associated with the identification instrument 122) from the application 104 and can compare the non-payment data to stored user data, as described below with reference to data stored in the data store(s). In some examples, the authorization module 206 can determine whether the identifier corresponds to a user (e.g., a user profile) and if so, what permission(s) are associated with the user. If the non-payment data is received in association with a request to perform an operation, the authorization module 206 can determine whether the user has permission to perform the operation. In such an example, the authorization module 206 can send an indication of whether the user is authorized to perform the operation to the user computing device 102. In some examples, the authorization module 206 can send an indication of permission(s) associated with the user to the user computing device 102 and the user computing device 102 can store such permission(s) at least temporarily (e.g., for a designated period of time, for as long as the user is logged in, for a designed number of transactions, etc.).

In at least one example, the payment processing module 208 can receive transaction data, which can include payment data, from the application 104, described above with reference to FIG. 1. The payment processing module 208 can transmit requests (e.g., authorization, capture, settlement, etc.) to payment service server computing device(s) to facilitate transactions between merchants and customers. The payment processing module 208 can communicate the successes or failures of payments of such transactions to the application 104. In some examples, the payment processing module 208 can receive transaction data from other payment mechanisms such as online payment portals, or the like.

Additional details associated with the authorization module 206 and/or the payment processing module 208 are described below with reference to FIGS. 3-6.

In at least one example, the recommendation module 210 can generate recommendations based at least in part on authorization data associated with merchants of the payment processing services and/or authorization services described above. Additional details associated with such recommendations are described below with reference to FIG. 9.

In at least one example, the example environment 200 can include one or more data stores (e.g., data store(s) 212), which can store data, including user data 214 and permission data 216. In some examples, the data store(s) 212 can be remotely located from the user computing device 102 and/or the server(s) 204 and the user computing device 102 and/or the server(s) 204 can access the data store(s) 212 over the network(s) 205. In some examples, the data store(s) 212 can be stored on the server(s) 204 and the user computing device 102 can access the data store(s) 212 over the network(s) 205. In some examples, at least a portion of the data stored in the data store(s) 212 can be stored on the user computing device 102.

The user data 214 can be associated with user profiles, which can include, for example, profiles of merchants and employees.

Merchant profiles can store, or otherwise be associated with, data associated with merchants. For instance, a merchant profile can store, or otherwise be associated with, data about a merchant (e.g., name of the merchant, geographic location of the merchant, operating hours of the merchant, employee data, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan data associated with the merchant (e.g., previous loans made to the merchant, previous defaults on said loans, etc.), risk data associated with the merchant (e.g., indications of risk, instances of fraud, chargebacks, etc.), appointments data (e.g., previous appointments, upcoming (scheduled) appointments, timing of appointments, lengths of appointments, etc.), payroll data (e.g., employees, payroll frequency, payroll amounts, etc.), employee data, permission data (e.g., indications of which operations are associated with permission(s), which employees have said permission(s), etc.), reservations data (e.g., previous reservations, upcoming (scheduled) reservations, interactions associated with such reservations, etc.), inventory data, customer service data, etc. The merchant profile can securely store bank account data as provided by the merchant.

Employee profiles can store, or otherwise be associated with, data associated with employees. For instance, an employee profile can store, or otherwise be associated with a name of the employee, a birthdate of an employee, an email of an employee, a phone number of an employee, job title(s) of the employee, compensation data associated with the employee (e.g., amount(s), frequency, etc.), previous jobs of the employee, previous employers of the employee, appointments data (e.g., previous appointments, upcoming (scheduled) appointments, timing of appointments, lengths of appointments, etc.), transaction data associated with the employee (e.g., transactions conducted by the employee, payment data associated with the transactions, items associated with the transactions, descriptions of items associated with the transactions, itemized and/or total spends of each of the transactions, parties to the transactions, dates, times, and/or locations associated with the transactions, etc.), disciplinary data (e.g., indicating disciplinary actions taken on the employee), award data (e.g., indicating awards given to the employee), feedback data, loyalty data, permission data (e.g., indicating which operations can be performed by the employee), etc. In at least one example, an employee profile can store one or more identifiers associated with an employee, such as a PIN, a unique identifier associated with an identification instrument, security question(s), biometric data associated with the employee, and the like.

The permission data 216 can store, or otherwise be associated with, data associated with permission(s). In some examples, at least a portion of the permission data 216 can be mapped to, or otherwise associated with, the user data 214. In at least one example, the permission data 216 can store indications of operation(s) and permission(s) required to perform such operation(s). In some examples, such permission(s) include individual identities (e.g., identifiers) of users who are permitted to perform such operations. In some examples, such permission(s) include types, titles, or levels of users who are permitted to perform such operations. In some examples, such permission(s) include identifiers (e.g., group identifiers, team identifiers, etc.) that, when a user is associated with a particular one of the identifiers, the user can perform a particular operation. In some examples, the permission data 216 can be designated by merchants (e.g., employers). That is, in at least one example, a merchant can indicate which operations require authorizations and the like. In other examples, the permission data 216 can be designated by the service provider. That is, in at least one example, the service provider can indicate which operations require authorizations and the like, which, in some examples, can be informed based at least in part on recommendations, as described below. In such an example, merchants (e.g., employers) can modify the service provider's designations.

Figure 9:
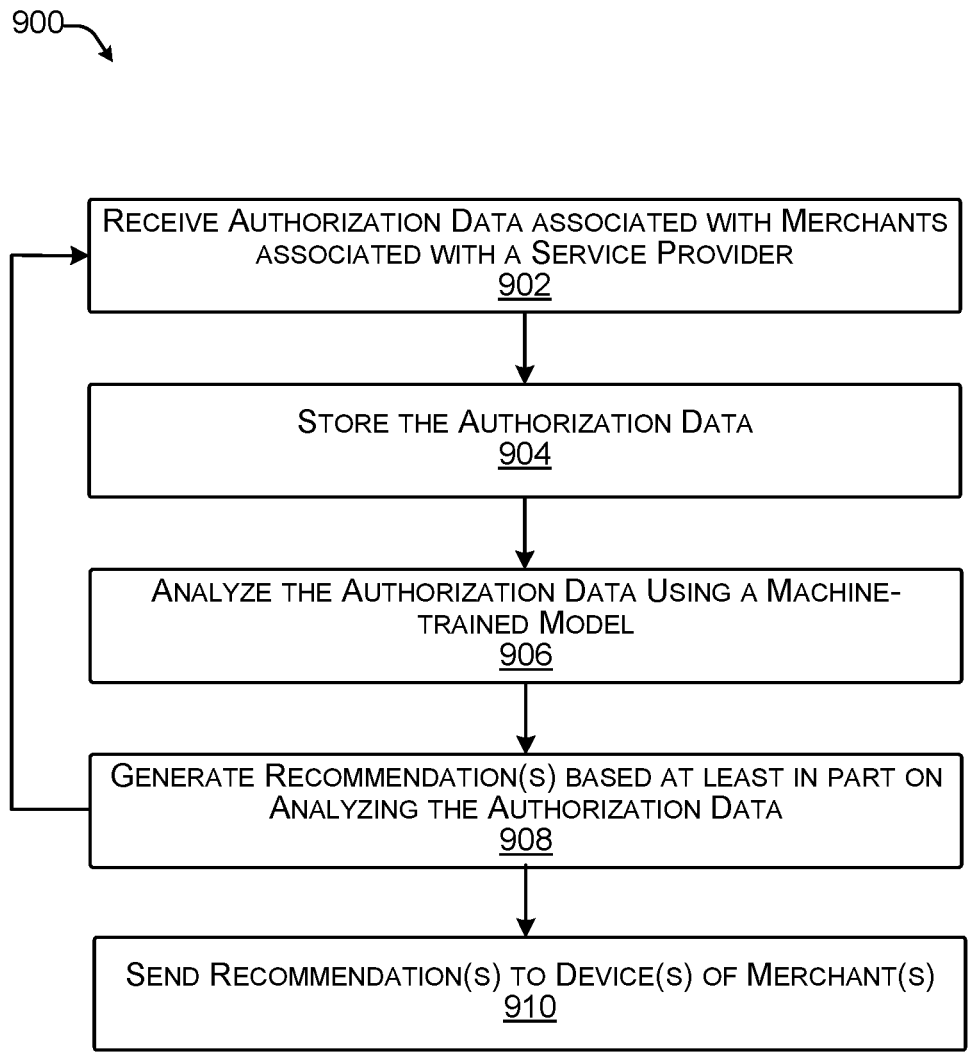
FIG. 9 illustrates an example process for generating recommendations based at least in part on authorization data, as described herein.
Figure 10:
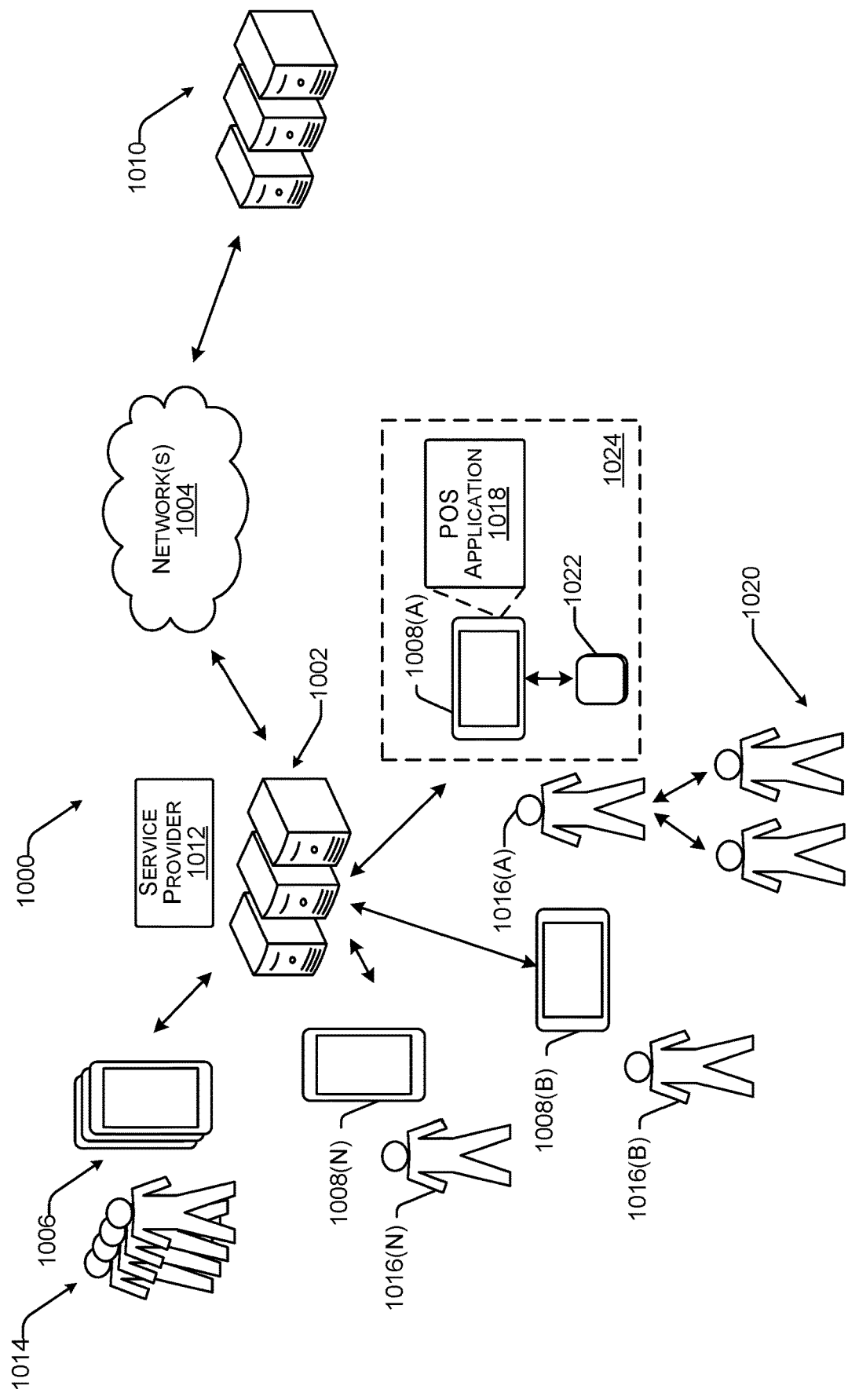
FIG. 10 illustrates an example merchant ecosystem for facilitating, among other things, techniques described herein.

FIGS. 3-8 are flowcharts showing example processes involving techniques as described herein. The processes illustrated in FIGS. 3-8 are described with reference to FIGS. 1 and 2 for convenience and ease of understanding. FIGS. 9 and 10 provide additional details associated with the components of FIGS. 1 and 2 above. The processes illustrated in FIGS. 3-8 are not limited to being performed using components described in FIGS. 1 and 2, and such components are not limited to performing the processes illustrated in FIGS. 3-8.

The processes 300-800 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes 300-800 can be combined in whole or in part with each other or with other processes.

Figure 3:
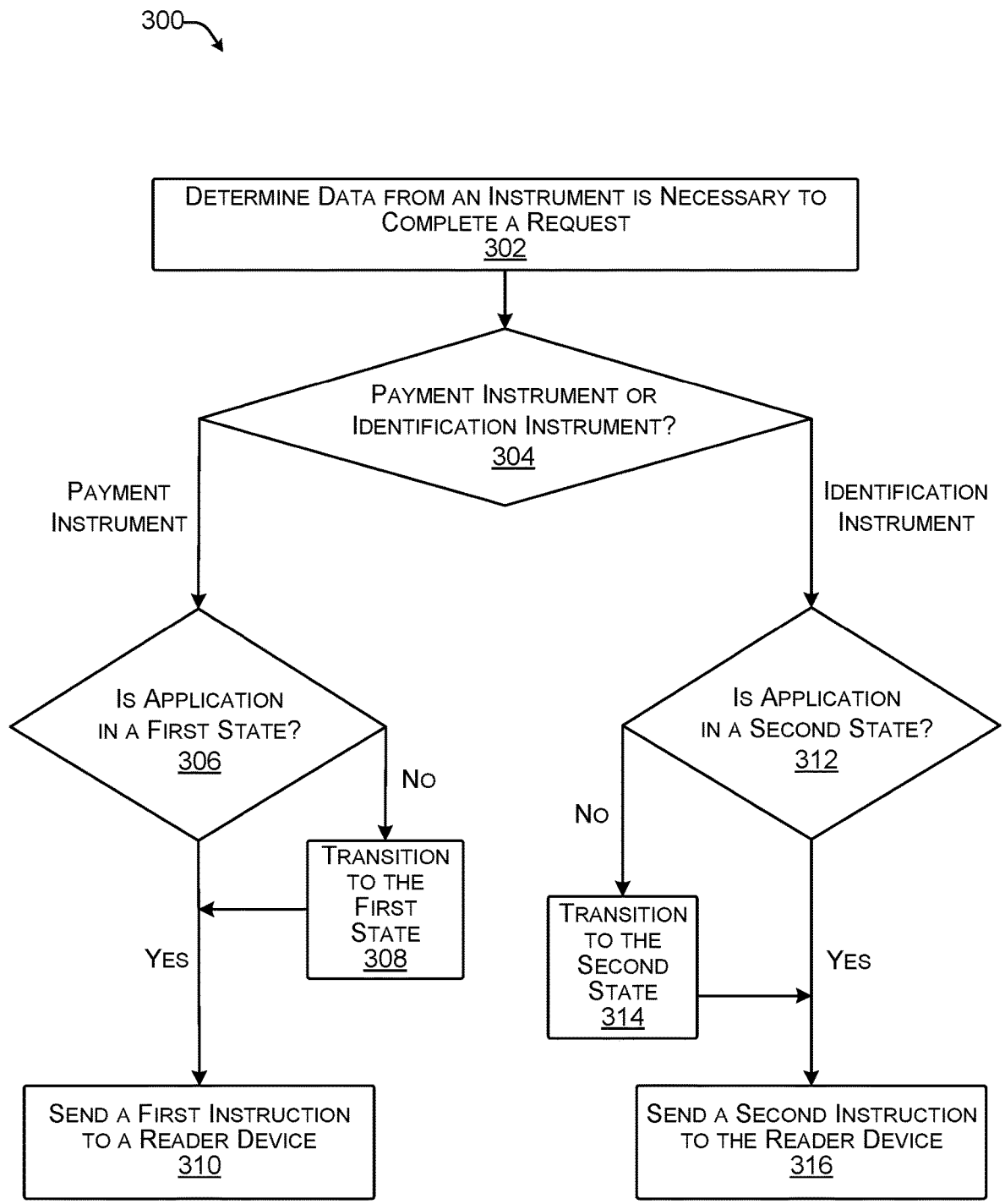
FIG. 3 illustrates an example process for transitioning an application between different states based on a type of instrument to be read, as described herein.

FIG. 3 illustrates an example process 300 for transitioning an application between different states based on a type of instrument to be read, as described herein.

At operation 302, the application 104 can determine data from an instrument is necessary to complete a request. As described above, in at least one example, the user computing device 102 can have an application 104 installed thereon. The application 104 can be a desktop application, a web browser application, or a dedicated application (e.g., provided by a service provider, provided by a third-party, etc.). In at least one example, the application 104 can specially configure the user computing device 102 as a POS terminal for processing transactions, and performing other operations (e.g., authorizations, etc.). In at least one example, the application 104 can configure the user computing device 102 to exchange data with a reader device 106 that can be coupled to the user computing device 102 and/or with the server(s)) 202. In at least one example, the application 104 can present GUIs and/or otherwise present data to enable users, such as the user 108, to interact with the user computing device 102 for accessing functionality and/or services as described herein.

In at least one example, a user can interact with the user computing device 102, for example, via a GUI or other user interface. In at least one example, such an interaction can be associated with a request to perform an operation. For example, the user can request to process a payment for a transaction, the user can request to perform a log-in operation, a clock-in operation, an override operation, a refund operation, a cancel-transaction operation, or the like. Additional or alternative operations that can be performed via the application 104 are described below with reference to FIGS. 9 and 10.

In at least one example, if a request is associated with processing a payment for a transaction, the request can be associated with a payment flow. In some examples, a customer can tender payment via a payment instrument such as a credit card, debit card, or the like. In such an example, the application 104 can determine that, to complete payment for the transaction, payment data associated with such a payment instrument is necessary. In at least one example, such payment data can be read by a reader device 106 associated with the user computing device 102. In an alternative example, such payment data can be input via the application 104. In both examples, the application 104 can prompt the user to obtain the payment data.

In at least one example, if the request is to perform an operation that requires authorization, the request can be associated with an authorization flow (e.g., a non-payment flow). In some examples, the application 104 can determine that, to determine whether the requesting user is authorized to perform the operation, identifying data from an identification instrument is necessary. As such, the application 104 can prompt the user for an identifier of the user (e.g., to determine whether the user is authorized to perform the operation).

At operation 304, the application 104 can determine whether the instrument (e.g., from which the data is to be read) is a payment instrument or an identification instrument. In at least one example, as described above, the application 104 can determine a type of data that is necessary to complete the request and can thus determine the type of instrument with which such data is associated. As described above, in at least one example, the application 104 can transition between different states, depending which type of data and/or instrument is to be read by the reader device 106. In at least one example, such a differentiation (e.g., between a payment flow and an authorization flow) can be made by the application 104 based at least in part on which GUI or user interface the application 104 is presenting (e.g., a payment GUI or an authorization GUI).

At operation 306, the application 104 can determine whether it is in a first state for processing payment data. In at least one example, a first state can be associated with a payment flow, for processing a payment for a transaction. If the application 104 is not in the first state, the application 104 can transition to the first state, as illustrated at operation 308. For example, in at least one example, if the application 104 is not in the first state, the application 104 can cause a user interface to be output to prompt the user 108 to indicate or otherwise provide an instruction to transition to the first state. In another example, the application 104 can receive an instruction from the reader device 106 (e.g., if the reader device 106 detects a payment instrument) to prompt the user 108 to provide an instruction to transition to the first state. Based at least in part on receiving such an instruction (e.g., to transition to the first state), the application 104 can transition to the first state. In an alternative example, the application 104 can transition to the first state automatically responsive to receiving an indication from the reader device 106 that the reader device 106 has detected a payment instrument.

In the first state, the application 104 can send a first instruction to a reader device 106, as illustrated at operation 310. The first instruction can cause the reader device 106 to activate an antenna of the antenna(s) 203 and prepare to read payment data associated with a payment instrument by establishing a unique communication session that is particular to the payment instrument. In some examples, the first instruction can indicate a frequency band (e.g., an NFC frequency band) with which the antenna is to be associated to read the payment data (e.g., as opposed to other types of data) via a secure communication channel. In some examples, the first state can additionally instruct the reader device 106 as to which type of encryption it is to perform. In other examples, the first instruction can indicate a type of data to be read and the reader device 106 can determine the frequency band and/or encryption based on the type of data to be read.

At operation 312, the application 104 can determine whether it is in a second state for authorizing the user to perform the requested operation. In at least one example, a second state can be associated with an authorization flow, for determining whether the user is authorized to perform the requested operation. If the application 104 is not in the second state, the application 104 can transition to the second state, as illustrated at operation 314. For example, in at least one example, if the application 104 is not in the second state, the application 104 can cause a user interface to be output to prompt the user 108 to indicate or otherwise provide an instruction to transition to the second state. In another example, the application 104 can receive an instruction from the reader device 106 (e.g., if the reader device 106 detects a non-payment instrument) to prompt the user 108 to provide an instruction to transition to the second state. Based at least in part on receiving such an instruction (e.g., to transition to the second state), the application 104 can transition to the second state. In an alternative example, the application 104 can transition to the second state automatically responsive to receiving an indication from the reader device 106 that the reader device 106 has detected a non-payment instrument.

In the second state, the application 104 can send a second instruction to the reader device 106, as illustrated at operation 316. The second instruction can cause the reader device 106 to activate an antenna of the antenna(s) 203 and prepare to read non-payment data associated with an identification instrument by establishing a unique communication session that is particular to the identification instrument. In some examples, the second instruction can indicate a frequency band (e.g., an NFC frequency band) with which the antenna is to be associated to read the non-payment data (e.g., as opposed to other types of data, such as payment data) via a secure communication channel. In some examples, the second state can additionally instruct the reader device 106 as to which type of encryption it is to perform, which can be different than the encryption performed for payment data. In other examples, the second instruction can indicate a type of data to be read and the reader device 106 can determine the frequency band and/or encryption based on the type of data to be read.

In some examples, as described above, the antenna can be a second antenna which can be provisioned for configuring the reader device 106 to read non-payment data and to allow the communication between the reader device 106 and the merchant device 102 to happen over a communication channel separate from and different than the secure and encrypted channel on which payment data may be transmitted. In such an example, the second instruction can cause the reader device 106 to activate the second antenna, while keeping the first antenna (e.g., configured for reading payment data) disabled, or activated, but solely for accepting payment instruments.

Figure 4:
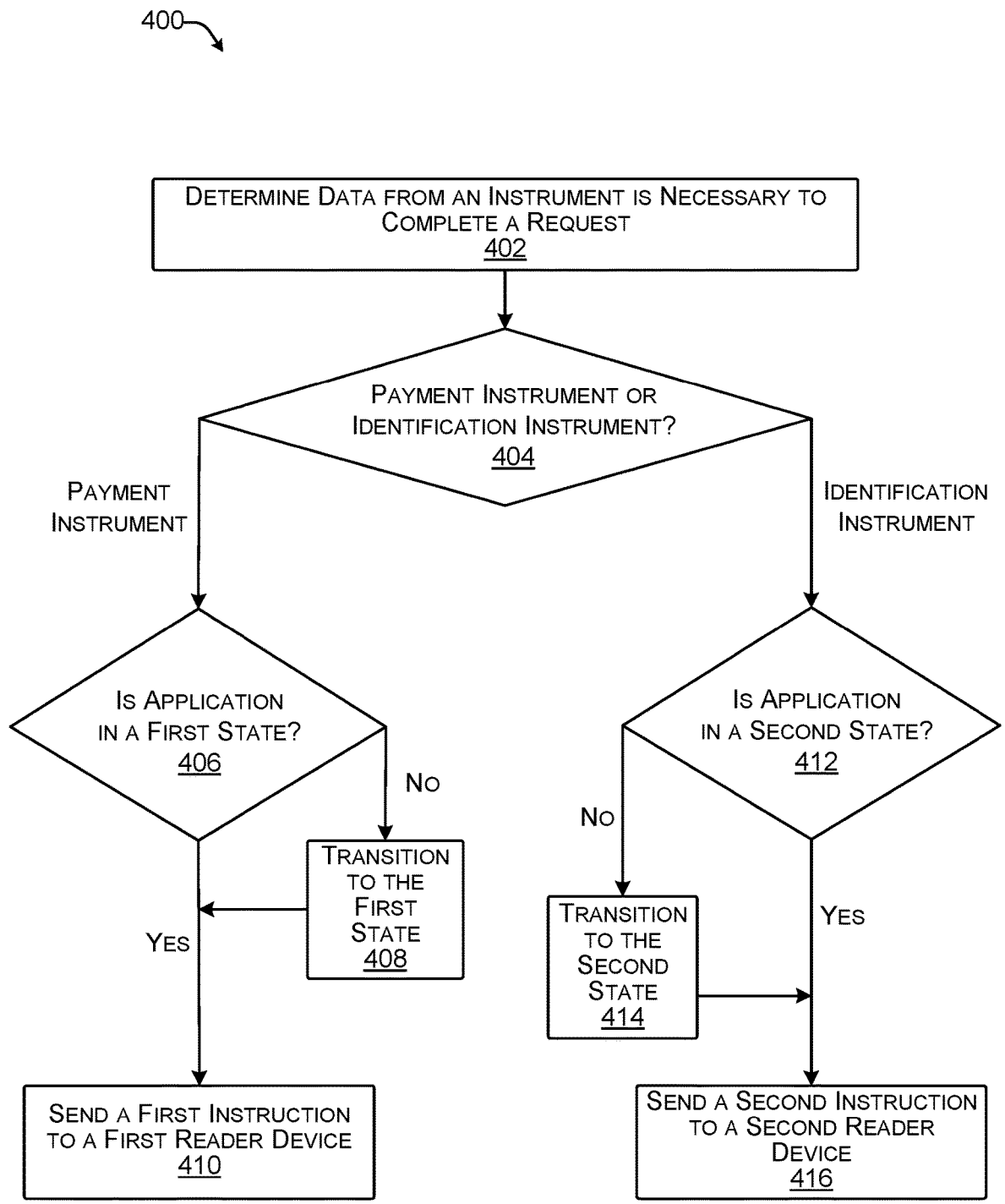
FIG. 4 illustrates another example process for transitioning an application between different states based on a type of instrument to be read, as described herein.

FIG. 4 illustrates another example process 400 for transitioning an application between different states based on a type of instrument to be read, as described herein.

At operation 402, the application 104 can determine data from an instrument is necessary to complete a request, as described above with respect to operation 302.

At operation 404, the application 104 can determine whether the instrument is a payment instrument or an identification instrument, as described above with respect to operation 304.

At operation 406, the application 104 can determine whether it is in a first state for processing payment data. If the application 104 is not in the first state, the application 104 can transition to the first state, as illustrated at operation 408, and, when in the first state, can send a first instruction to a first reader device, as illustrated at operation 410. In at least one example, the operations 406-410 can be similar to the operations 306-310 described above with reference to FIG. 3.

At operation 412, the application 104 can determine whether it is in a second state for authorizing the user to perform the requested operation. If the application 104 is not in the second state, the application 104 can transition to the second state, as illustrated at operation 414, and, when in the second state, can send a second instruction to a second reader device, as illustrated at operation 416. In at least one example, the operations 412-416 can be similar to the operations 312-316, except for the fact that the application 104 can send the second instruction to a different reader device than the reader device where the first instruction is sent.

In some examples, as described above, the user computing device 102 can comprise multiple components, such as a customer-facing component and a merchant-facing component. In such examples, a reader device can be coupled to the customer-facing component or the merchant-facing component. In some examples, a reader device can be coupled to the customer-facing component and/or the merchant-facing component, and the customer-facing component and/or the merchant-facing component can be associated with their own integrated reader device. That is, in some examples, a POS system can include multiple components and/or multiple reader devices in a one-to-one or many-to-one configuration. In examples where a POS system includes multiple reader devices, different reader devices can be configured to read different types of data. In such examples, the application 104 can send the first instruction and the second instruction to different reader devices, as illustrated at operations 410 and 416.

Figure 5:
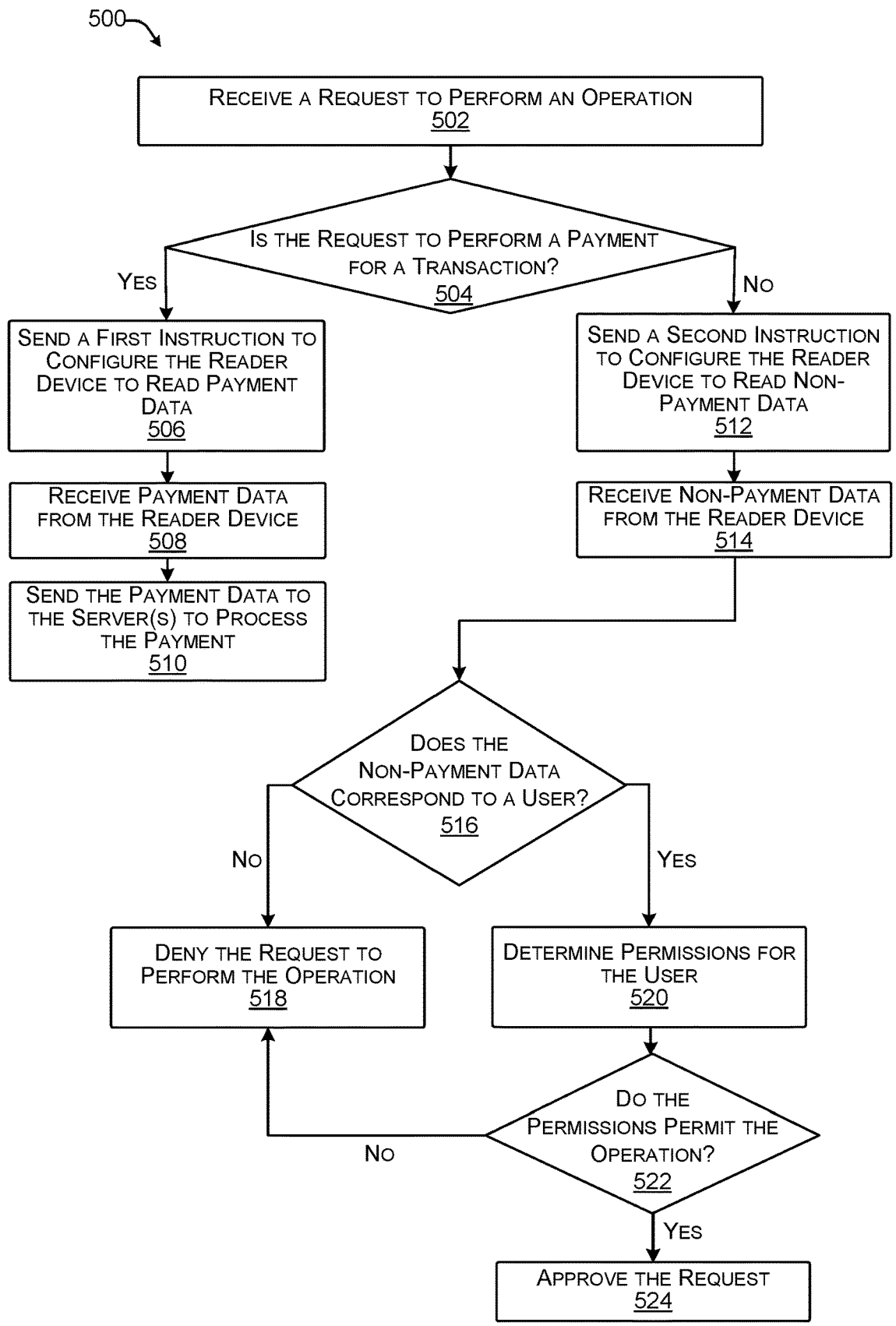
FIG. 5 illustrates an example process for point-of-sale authorization using an application that can transition between different states depending on a type of instrument to be read, as described herein.

FIG. 5 illustrates an example process 500 for POS authorization using an application that can transition between different states depending on a type of instrument to be read, as described herein.

At operation 502, the application 104 can receive a request to perform an operation. As described above, in at least one example, the user computing device 102 can have an application 104 installed thereon. In at least one example, a user, such as the user, can interact with the user computing device 102, for example, via a GUI or other user interface that can be presented by the application 104. In at least one example, such an interaction can be associated with a request to perform an operation. For example, the user can request to process a payment for a transaction, the user can request to perform a log-in operation, a clock-in operation, an override operation, a refund operation, a cancel-transaction operation, or the like. Additional or alternative operations that can be performed via the application 104 are described below with reference to FIGS. 9 and 10.

At operation 504, the application 104 can determine whether the request is to perform a payment for a transaction. In at least one example, the application 104 can analyze the request to determine whether the request is associated with processing a payment for a transaction. If the request is associated with processing payment for a transaction, the request can be associated with a payment flow. In some examples, a customer can tender payment via a payment instrument such as a credit card, debit card, or the like. In such an example, the application 104 can determine that, to complete payment for the transaction, payment data associated with such a payment instrument is necessary. In at least one example, such payment data can be read by a reader device 106 associated with the user computing device 102. In at least one example, the application 104 can prompt the user to obtain the payment data, for example via a payment GUI. In at least one example, the payment GUI can include a control or other mechanism that when actuated causes the application 104 to send a first instruction to the reader device 106.

At operation 506, the application 104 can send a first instruction to configure the reader device 106 to read payment data. As described above, with reference to FIG. 3, the application 104 can determine whether it is in a first state for processing payment data. In at least one example, a first state can be associated with a payment flow for processing a payment for a transaction. That is, in at least one example, the first state can be associated with the payment GUI. If the application 104 is not in the first state, the application 104 can transition to the first state. While in the first state, the application 104 can send a first instruction to a reader device 106. The first instruction can cause the reader device 106 to activate an antenna of the antenna(s) 203 (at the proper frequency) and prepare to read payment data associated with a payment instrument by establishing a unique communication session that is particular to the payment instrument.

At operation 508, the application 104 can receive payment data from the reader device 106. In at least one example, based at least in part on sending the first instruction, the application 104 can receive the payment data from the reader device 106. In some examples, the payment data can be encrypted. In at least one example, the application 104 can associate the payment data with transaction data. The transaction data can include user authentication data, purchase amount data, point-of-purchase data (e.g., item(s) purchased, date of purchase, time of purchase, etc.), etc.

At operation 510, the application 104 can send the payment data to the server(s) 204 to process the payment. In at least one example, the application 104 can send the payment data, which can be associated with transaction data, to the server(s) 204. As described above, in at least one example, the payment processing module 208 can receive payment data, which can be associated with the transaction data, from the application 104. The payment processing module 208 can transmit requests (e.g., authorization, capture, settlement, etc.) to payment service server computing device(s) to facilitate process payment for the transaction using the payment data. The payment processing module 208 can communicate the success or failure of the payment to the application 104.

Returning to operation 504, in at least one example, if the request is to perform an operation that requires authorization, the request can be associated with an authorization flow. In some examples, the application 104 can determine that, to determine whether the requesting user is authorized to perform the requested operation, that identifying data from an identification instrument is necessary. As such, the application 104 can prompt the user for an identifier of the user (e.g., to determine whether the user is authorized to perform the operation). In some examples, such a prompt can be presented via an authorization GUI or another user interface presented by the application 104. In at least one example, presentation of the authorization GUI can cause the application 104 to send a second instruction to configure the reader device 106 to read non-payment data associated with an identification instrument.

At operation 512, the application 104 can send a second instruction to configure the reader device 106 to read non-payment data. As described above with reference to FIG. 3, the application 104 can determine that it is in a second state for authorizing the user 108 to perform the requested operation. In at least one example, a second state can be associated with an authorization flow, for determining whether the user is authorized to perform the requested operation. If the application 104 is not in the second state, the application 104 can transition to the second state. The application 104 can send a second instruction to the reader device 106, which can cause the reader device 106 to activate an antenna of the antenna(s) 203 (at the proper frequency) and prepare to read non-payment data associated with an identification instrument by establishing a unique communication session that is particular to the identification instrument.

In some examples, as described above, the antenna can be a second antenna (different from the first antenna described above with reference to operation 506) which can be provisioned for configuring the reader device 106 to read non-payment data and to allow the communication between the reader device 106 and the merchant device 102 to happen over a communication channel separate from and different than the secure and encrypted channel on which payment data may be transmitted. In such an example, the second instruction can cause the reader device 106 to activate the second antenna, while keeping the first antenna (e.g., configured for reading payment data) disabled, or activated, but solely for accepting payment instruments.

At operation 514, the application 104 can receive non-payment data from the reader device 106. In at least one example, based at least in part on sending the second instruction, the application 104 can receive the non-payment data from the reader device 106. In some examples, the non-payment data can be encrypted. In at least one example, the non-payment data can include an identifier that is particular to the identification instrument. In some examples, the application 104 can send the non-payment data to the server(s) 204, for analysis by the authorization module 206. In other examples, the application 104 can perform such an analysis. In some examples, the application 104 and the authorization module 206 can perform some of the operations in a distributed fashion.

At operation 516, the application 104 and/or the authorization module 206 can determine whether the non-payment data corresponds to a user. In at least one example, the application 104 and/or the authorization module 206 can compare the non-payment data to stored user data 214, which can be stored in the data store(s) 212. That is, the application 104 and/or the authorization module 206 can access the data store(s) 212 and can compare the identifier with user profiles stored in the user data 214. In some examples, the application 104 and/or the authorization module 206 can determine whether the identifier corresponds to a user (e.g., a user profile) based at least in part on determining whether the identifier associated with the non-payment data is mapped to, or otherwise associated with, an indication of a user in the user data 214. In at least one example, if the non-payment data does not correspond to a user, the application 104 can deny the request to perform the operation, as illustrated at operation 518, or request another form of identification.

At operation 520, the application 104 and/or the authorization module 206 can determine permission(s) for the user. In some examples, the application 104 and/or the authorization module 206 can determine whether the identifier corresponds to a user (e.g., a user profile) and if so, what permission(s) are associated with the user. In some examples, such permission(s) can be associated with a user profile of the user. In some examples, such permission(s) can be stored in the permission data 216, described above.

At operation 522, the application 104 and/or the authorization module 206 can determine whether the permission(s) permit the operation. In at least one example, the application 104 and/or the authorization module 206 can determine whether the permission(s) associated with the user enable the user to perform the requested operation. That is, if the non-payment data is received in association with a request to perform an operation, the application 104 and/or the authorization module 206 can determine whether the user has permission to perform the operation. If the permission(s) permit the operation, the application 104 can approve the request, as illustrated at operation 524. If the permission(s) do not permit the operation, the application 104 can deny the request, as illustrated at operation 518.

In some examples, if the authorization module 206 is performing operations 516-522, the authorization module 206 can send an indication of whether the permission(s) authorize the user to perform the requested operation to the application 104. In such examples, the application 104 can receive the indication and can output the indication via a user interface. If the application 104 is performing operations 516-522, the application 104 can output the indication of whether the request is approved or denied. In some examples, such indication(s) can be output via a GUI or other user interface.

Figure 6:
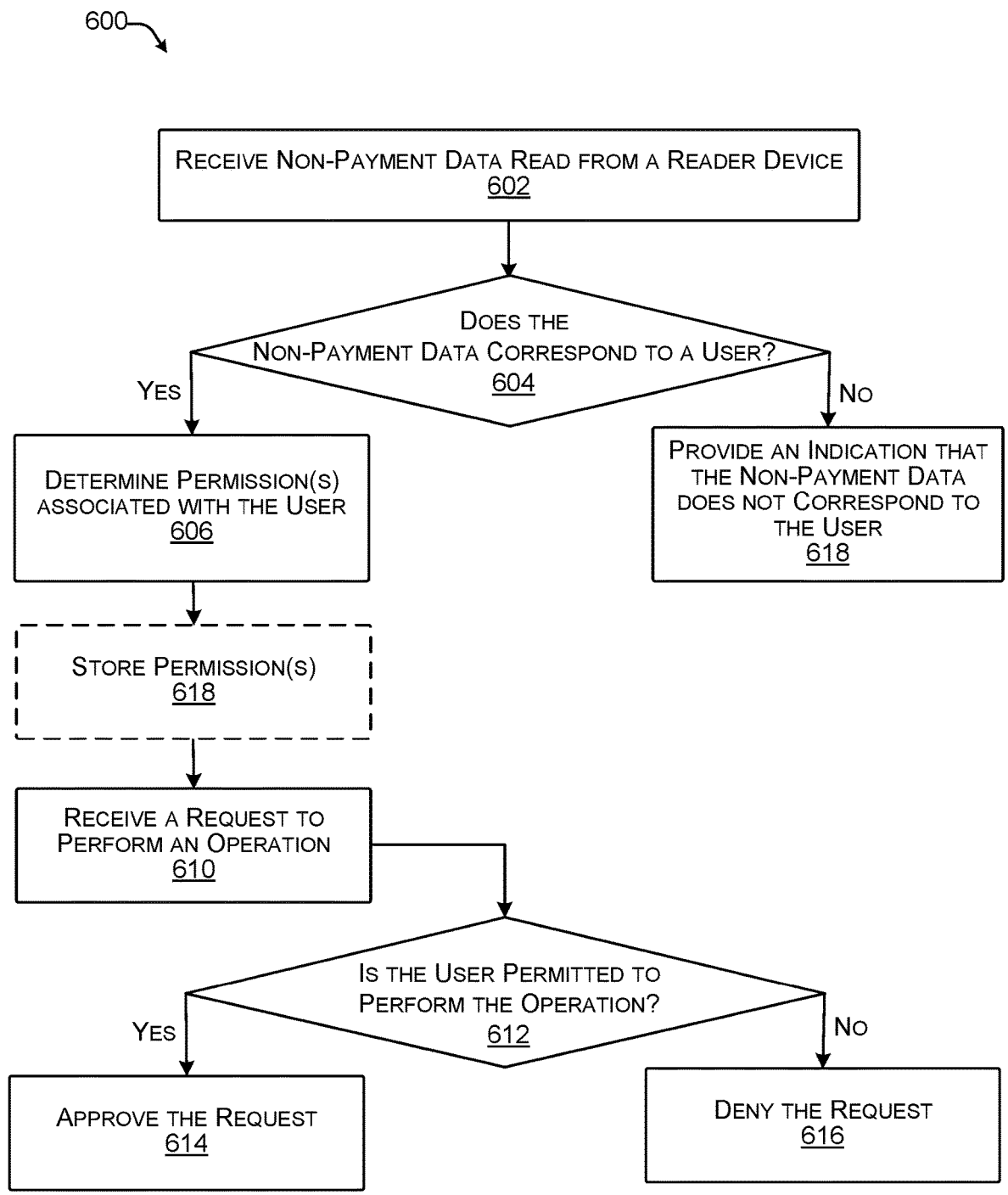
FIG. 6 illustrates an example process for performing point-of-sale authorization based at least in part on using an application that can transition between different states depending on a type of instrument to be read, as described herein.

FIG. 6 illustrates an example process 600 for performing POS authorization using an application that can transition between different states depending on a type of instrument to be read, as described herein.

At operation 602, the application 104 can receive non-payment data from a reader device 106. In at least one example, the application 104 can receive data from the reader device 106. In some examples, the data can be associated with an indication that the data is non-payment data and/or a frequency band via which the data was read (e.g., a frequency band that is associated with non-payment data instead of payment data). In at least one example, the non-payment data can be associated with an identifier, which can be unique to an identification instrument and associated with a user. In at least one example, the non-payment data can be encrypted.

In some examples, the non-payment data can be received responsive to the application 104 sending an instruction. For instance, as described above, in some examples, the application 104 can cause a GUI (e.g., an authorization GUI), or other user interface, to be presented via a user computing device 102, which can indicate that authorization is required (e.g., to perform an operation). In at least one example, based at least in part on causing the GUI, or other user interface to be presented, the application 104 can send an instruction to the reader device 106, to cause the reader device 106 to turn on an antenna of the antenna(s) 203 and prepare to read non-payment data. In such an example, the application 104 can receive the non-payment data from the reader device 106 responsive to sending the instruction.

In some examples, the non-payment data can be received by the application 104 without the application 104 having first sent an instruction. That is, in some examples, the reader device 106 can be configured to listen for different types of data, which can be read by different frequency bands with which the antenna of the reader device 106 is configured to service. In some examples, based at least in part on detecting an instrument within a threshold distance of the reader device 106, the reader device 106 can read data associated with the instrument. If the data is read by a frequency band that corresponds to non-payment data, the reader device 106 can send the data to the application 104, with an indication that the data is non-payment data and/or via the frequency band from which it was read.

In some examples, the non-payment data can be received with such an indication while an authorization GUI, or other user interface, is presented and/or responsive to an instruction having been sent, as described above.

In some examples, the application 104 can send the non-payment data to the server(s) 204, for analysis by the authorization module 206. In other examples, the application 104 can perform such an analysis, as described below. In some examples, the application 104 and the authorization module 206 can perform some of the operations in a distributed fashion.

At operation 604, the application 104 and/or the authorization module 206 can determine whether the non-payment data corresponds to a user. In at least one example, the application 104 and/or the authorization module 206 can compare the non-payment data to stored user data 214, which can be stored in the data store(s) 212. That is, the application 104 and/or the authorization module 206 can access the data store(s) 212 and can compare the identifier with user profiles stored in the user data 214. In some examples, the application 104 and/or the authorization module 206 can determine whether the identifier corresponds to a user (e.g., a user profile) based at least in part on determining whether the identifier associated with the non-payment data is mapped to, or otherwise associated with, an indication of a user in the user data 214. In at least one example, if the non-payment data does not correspond to a user, the application 104 can deny the request to perform the operation, as illustrated at operation 518, or can request another form of identification.

At operation 606, the application 104 and/or the authorization module 206 can determine permission(s) associated with the user. In some examples, the application 104 and/or the authorization module 206 can determine whether the identifier corresponds to a user (e.g., a user profile) and if so, what permission(s) are associated with the user. In some examples, such permission(s) can be associated with a user profile of the user. In some examples, such permission(s) can be stored in the permission data 216, described above. In at least one example, if the authorization module 206 determines the permission(s), the authorization module 206 can send the permission(s) to the application 104, and the application 104 can store the permission(s), as illustrated at operation 608. In another example, if the application 104 determines the permission(s), the application 104 can store the permission(s), as illustrated at operation 608. That is, in some examples, the application 104 can store the permission(s) locally, at least temporarily, for example, for a designated period of time, for as long as the user is logged in, for a designed number of transactions, etc.

At operation 610, the application 104 can receive a request to perform an operation. As described above, in at least one example, a user can interact with the user computing device 102, for example, via a GUI or other user interface that can be presented by the application 104. In at least one example, such an interaction can be associated with a request to perform an operation. For example, the user can request to process a payment for a transaction, the user can request to perform a log-in operation, a clock-in operation, an override operation, a refund operation, a cancel-transaction operation, or the like. Additional or alternative operations that can be performed via the application 104 are described below with reference to FIGS. 9 and 10.

In at least one example, the application 104 can analyze the request to determine whether the request is associated with processing a payment for a transaction. If the request is associated with processing payment for a transaction, the request can be associated with a payment flow as described above with reference to operations 506-510. If the request is associated with an operation that requires authorization, the application 104 and/or the authorization module 206 can analyze the permission(s) to determine whether the user has permission to perform the operation. If the permission(s) permit the operation, the application 104 can approve the request, as illustrated at operation 612. If the permission(s) do not permit the operation, the application 104 can deny the request, as illustrated at operation 614.

In some examples, if the authorization module 206 is performing operations 604-610, the authorization module 206 can send an indication of whether the permission(s) authorize the user to perform the requested operation to the application 104. In such examples, the application 104 can receive the indication and can output the indication via a user interface. If the application 104 is performing operations 604-610, the application 104 can output the indication of whether the request is approved or denied. In some examples, such indication(s) can be output via a GUI or other user interface.

Figure 7:
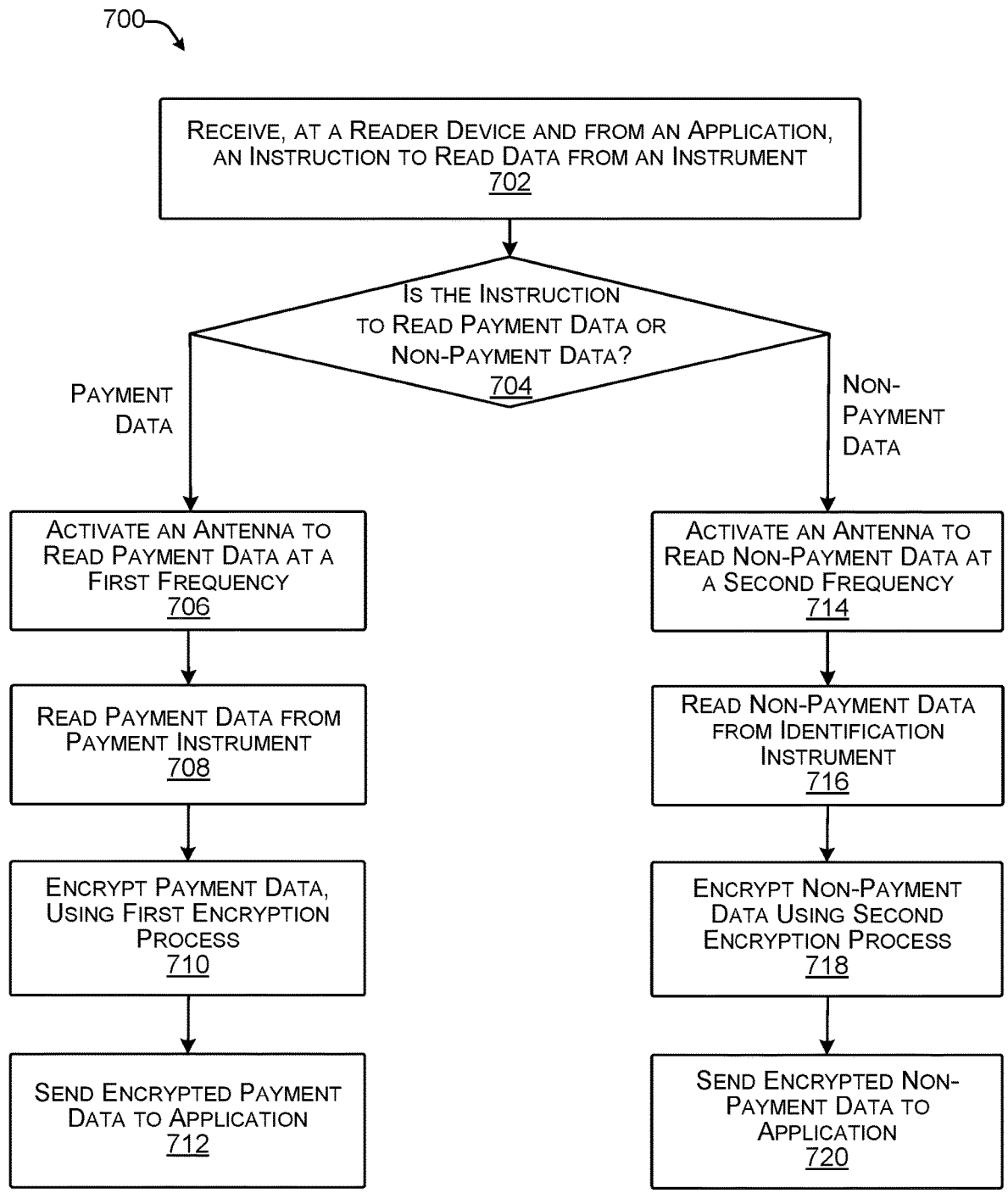
FIG. 7 illustrates an example process for reading payment or non-payment data, as described herein.

FIG. 7 illustrates an example process 700 for reading payment or non-payment data, as described herein. While FIG. 7 describes activating different frequency bands associated with antenna(s) 203 associated with the reader device 106, in additional or alternative examples, different protocols can be used to identify and/or read data from instruments. That is, in such an example, a first protocol can be used by the reader device 106 to read payment data from a payment instrument (e.g., the payment instrument 120) and a second protocol can be used by the reader device 106 to read non-payment data (e.g., identification data) from a non-payment instrument (e.g., the identification instrument 122). Firmware modifications can be made to firmware associated with the reader device to accommodate these protocols.

At operation 702, the reader device 106 can receive, from the application 104, an instruction to read data associated with an instrument. In at least one example, the application 104 can send instructions to the reader device 106, as described above. In some examples, the application 104 can send such an instruction via a wireless or wired connection between the user computing device 102 and the reader device 106. In at least one example, the reader device 106 can be in a low power mode, with its antenna(s) 203 off, to conserve battery power. In some examples, responsive to receiving the instruction, the reader device 106 can transition to a higher power mode and activate one or more of the antenna(s) 203 associated therewith. In other examples, the reader device 106 can be in a high-power mode and can tune one or more of the antenna(s) 203 associated therewith responsive to receiving the instruction.

At operation 704, the reader device 106 can determine whether the instruction is to read payment data or non-payment data. In at least one example, the reader device 106 can analyze the instruction to determine whether the instruction is to read payment data or non-payment data. As described above, if the instruction is associated with an instruction to read payment data, the instruction can prompt the reader device 106 to prepare to read payment data from a payment instrument. In some examples, the reader device 106 can activate an antenna of the antenna(s) 203 and can configure the antenna for servicing a first frequency band associated with reading payment data from a payment instrument, as illustrated at operation 706. In some examples, the first instruction can indicate which frequency band to activate and/or which encryption process to use for reading and/or encrypting the payment data.

At operation 708, the reader device 106 can read payment data from a payment instrument. The reader device 106 can wait a designated period of time for a payment instrument to move within a threshold distance of the reader device 106 to read payment data from the payment instrument. In some examples, the threshold distance can be based on a communication protocol facilitating the transmission of the payment data from the payment instrument to the reader device 106. For example, in at least one example, NFC protocols can be used for facilitating such a transmission when a customer "taps" his or her payment instrument with the reader device 106. In other examples, the customer can dip the payment instrument, swipe the payment instrument, or otherwise cause the payment instrument to move within a threshold distance of the reader device 106 such that the reader device 106 can read payment data associated with the payment instrument.

At operation 710, the reader device 106 can encrypt the payment data using a first encryption process. In some examples, the reader device 106 can read the payment data and encrypt the payment data prior to sending the payment data to the application 104, as illustrated at operation 712. The reader device 106 can enforce encryption of payment data prior to sending it to the application 104 and/or server(s) 204.

At operation 714, the reader device 106 can activate an antenna (e.g., of the antenna(s) 203) to read non-payment data at a second frequency. As described above, if the instruction is associated with a request to read non-payment data, the reader device 106 can prepare to read non-payment data from an identification instrument. In some examples, the reader device 106 can configure the antenna for servicing a second frequency band associated with reading non-payment data from an identification instrument. In some examples, the second frequency band can be the same as the first frequency band. In some examples, the second frequency band can be different than the first frequency band. In some examples, the second instruction can indicate which frequency band to activate and/or which encryption process to use for reading and/or encrypting the non-payment data.

In some instances, a second antenna of the antenna(s) 203 can be provisioned for configuring the reader device 106 to operate in a non-payment state, to allow the communication between the reader device 106 and the merchant device 102 to happen over a communication channel separate from and different than the secure and encrypted channel on which payment data may be transmitted. In such an example, depending on the nature of the instruction (e.g., on parsing the request and determining it to be for non-payment data, such as an identifier number, employee identifier, etc.), the reader device 106 can be directed to activate the second antenna, while keeping the first antenna (e.g., configured for reading payment data) disabled, or activated, but solely for accepting payment instruments.

At operation 716, the reader device 106 can read non-payment data from an identification instrument. In at least one example, the reader device 106 can wait a designated period of time for an identification instrument to move within a threshold distance of the reader device 106 to read non-payment data from the identification instrument. In some examples, the threshold distance can be based on a communication protocol facilitating the transmission of the non-payment data from the identification instrument to the reader device 106, as described above. For example, in at least one example, NFC protocols can be used for facilitating such a transmission when the user "taps" his or her identification instrument with the reader device 106. In other examples, the user can dip the identification instrument, swipe the identification instrument, or otherwise cause the identification instrument to move within a threshold distance of the reader device 106 such that the reader device 106 can read non-payment data associated with the identification instrument.

At operation 718, the reader device 106 can encrypt the non-payment data using a second encryption process. In some examples, the reader device 106 can read the non-payment data and encrypt the non-payment data prior to sending the non-payment data to the application 104, as illustrated at operation 720. In at least one example, the encryption process for encrypting the non-payment data can be different than the encryption process for encrypting the payment data. For example, the reader device 106 can send the unencrypted non-payment data to the server(s) 204 for encryption. In an additional or alternative example, a portion of the encryption process can be controlled by each employee key within a merchant store, for example, each employee's identity (e.g., UID) may be encrypted with a group-specific key which all employees privately share with each other. Once the non-payment instrument is read by the reader device 106, a communication session is established between the reader device 106 and server(s) 204 over a mutually authenticated secure channel, or over a secure channel that only authenticates the server(s) 204 (and not the identity of the employee). In addition to the UID, the reader device 106 can send the private key to allow the server(s) 204 to access employee specific data and thus allow a two-way communication between the employee user computing device 102 and the server(s) 204. In the absence of the key, the server(s) 204 may allow low-risk actions, such as, actions that non-employees can perform.

After performing operation 712 or operation 720, the reader device 106 can cause its antenna(s) 203 to return a default frequency band as its resting state waiting for a trigger to move it to a different band as described herein.

In some examples, a request to read non-payment data can be received by the reader device 106 after a request to read payment data is received, and before the payment data is read by the reader device 106. For example, a user can request to perform an operation within a payment flow that requires authorization. In such an example, the reader device 106 can receive a first instruction for reading payment data and then a second instruction for reading non-payment data. In at least one example, the reader device 106 can prioritize which type of data to read first. In some examples, the non-payment data can be prioritized before the payment data (e.g., to resolve an authorization request before continuing with the payment flow). In such examples, the non-payment data can be read by the reader device 106 and sent to the application 104 and then the payment data can be read by the reader device 106 and sent to the application 104. In some examples, the payment data and non-payment data can be sent to the application 104 together. In other examples, the payment data and non-payment data can be sent to the application 104 separately, as described above. In some examples, the payment data can be prioritized before the non-payment data.

Figure 8:
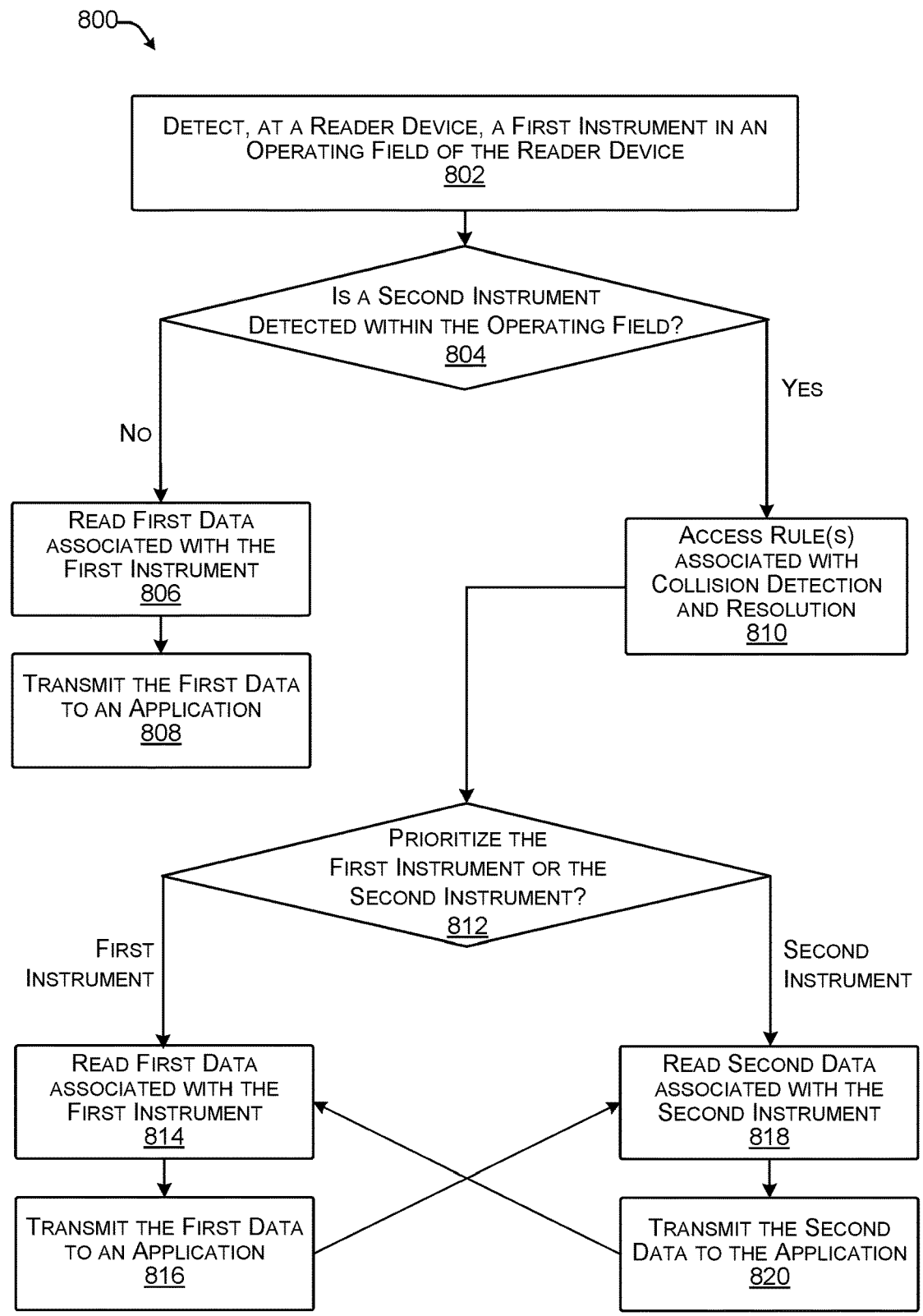
FIG. 8 illustrates an example process associated with a collision detection, wherein multiple instruments are detected within an operating field of the reader device.

FIG. 8 illustrates an example process 800 associated with a collision detection, wherein multiple instruments are detected within an operating field of the reader device 106.

At operation 802, the reader device 106 can detect a first instrument within an operating field of the reader device 106. In at least one example, an instrument polling sequence initiated by the reader device 106 polls and awaits responses from instruments that may be present in the operating field of the reader device 106. In some examples, if more than one type of instrument is supported by the reader device 106, the polling sequence can include wake-up commands for all supported types of instruments. In at least one example, the reader device 106 can detect a first instrument within the operating field of the reader device 106.

At operation 804, the reader device 106 can determine whether a second instrument is detected within the operating field. In some examples, the reader device 106 can detect a second instrument within the operating field of the reader device 106. In some examples, the first instrument and the second instrument can be different types of instruments (e.g., payment and non-payment).

At operation 806, if a second instrument is not detected, the reader device 106 can read first data associated with the first instrument and can transmit the first data to an application 104 associated with the user computing device 102, as illustrated at operation 808. In some examples, depending on the instrument type, the reader device 106 can read the first data via an antenna of the antenna(s) 203 associated with a particular frequency band associated with reading a particular type of data via a secure communication channel. In some examples, depending on the instrument type, the reader device 106 can encrypt the first data prior to sending the first data to the application 104.

At operation 810, the reader device 106 can access rule(s) associated with collision detection and resolution. In at least one example, rule(s) associated with collision detection and resolution can be stored in a data store. Such rule(s) can indicate a priority of instrument types that can be used to resolve collisions (e.g., multiple, different types of instruments are detected within the operating field of the reader device 106 at the same time). Such rule(s) can be associated with an collision detection and resolution method that can define what happens when multiple instruments enter the operating field of the reader device 106 at the same time, identifying how the reader device 106 determines which instrument to use in the transaction, and ensuring that all instruments presented are inventoried and processed.

At operation 812, the reader device 106 can determine whether to prioritize the first instrument or the second instrument. In at least one example, the reader device 106 can utilize the rule(s) to determine a priority for obtaining data from the first instrument and the second instrument. Based at least in part on determining to prioritize the first instrument (over the second instrument), the reader device 106 can read first data associated with the first instrument, as illustrated at operation 814 and described above at operation 806, and can transmit the first data to an application 104 associated with the user computing device 102, as illustrated at operation 816 and described above at operation 808.

Then, the reader device 106 can read second data associated with the second instrument, as illustrated at operation 818, and can transmit the second data to an application 104 associated with the user computing device 102, as illustrated at operation 820. In some examples, depending on the instrument type, the reader device 106 can read the second data via an antenna of the antenna(s) 203 associated with a particular frequency band associated with reading a particular type of data via a secure communication channel. In some examples, depending on the instrument type, the reader device 106 can encrypt the second data prior to sending the second data to the application 104.

Based at least in part on determining to prioritize the second instrument, the reader device 106 can read second data associated with the second instrument, as illustrated at operation 818, and can transmit the second data to an application 104 associated with the user computing device 102, as illustrated at operation 820. If the second instrument is prioritized first, then the reader device 106 can read the first data associated with the first instrument, as illustrated at operation 814, and can transmit the first data to the application, as illustrated at operation 816.

In at least one example, a non-payment instrument (e.g., the identification instrument 122) can be prioritized over a payment instrument (e.g., the payment instrument 120), such that when both instruments are detected at the same time, the reader device 106 can resort to exception processing. In such an example, the communication session created with respect to the payment instrument can be either halted or suspended and as such processing of the transaction through the payment instrument is halted or suspended. In such an example, a new communication session can be created to handle the non-payment instrument.

In another example, both instruments can be configured to parallelly and independently have established communication sessions with the reader device 106. The reader device 106 may activate a communication session with each of the instruments using activation commands appropriate to the identified type of instrument. After a transaction with an identified instrument has been processed, the instrument can be deactivated and removed. This can be made possible if both the instruments operate on different, even if slightly, frequency bands.

While FIGS. 7 and 8 are described with reference to the reader device 106 performing operations, in some examples, the reader management module 202 can perform one or more of the operations described above.

FIG. 9 illustrates an example process 900 for generating recommendations based on analysis of non-payment based actions, as described herein. While FIG. 9 describes "authorization data," any type of non-payment data can be used for generating recommendations as described herein. Such recommendations may be used by a merchant to inform whether additional or fewer non-payment instruments should be generated, whether a certain non-payment instrument is historically associated with fraudulent transactions, and so on.

At operation 902, the recommendation module 210 can receive authorization data associated with merchants associated with a service provider. As described above, the service provider can provide services to a plurality of merchants. The plurality of merchants can be different merchants, that are disparately located. Additional details are provided below with reference to FIG. 10. In at least one example, the server(s) 204 can receive data, of varying types, from the plurality of merchants. In some examples, the payment processing module 208 can receive transaction data, which can include payment data, for processing payments for merchants that utilize a payment processing service offered by the service provider. In some examples, the authorization module 206 can receive authorization data associated with merchants that utilize an authorization service offered by the service provider. In at least one example, such authorization data can include requests to activate identification instruments and associate such identification instruments with individual users, requests to deactivate identification instruments, permissions associated with individual operations, types of identity instruments, hardware/device configurations, and the like. In at least one example, the authorization data can be stored in the data store(s) 212, as illustrated at operation 904.

At operation 906, the recommendation module 210 can analyze the authorization data using a machine-trained model. In at least one example, the recommendation module 210 can access the authorization data and can analyze the authorization data using a machine-trained model. In at least one example, the machine-trained model can be a model trained using a machine learning mechanism. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, the machine-trained model can be trained to identify similarities and/or trends among merchants (e.g., based on merchant data, transaction data, authorization data, etc.) with respect to how such merchants utilize authorization services (e.g., a number of activated identity instruments, a number of deactivated identity instruments, types of identity instruments, hardware/device configurations, permission(s), operation(s) requiring permission(s), etc.). That is, such similarities and/or trends can be identified based on merchant classification codes, geographic locations, inventory items, payment processing data, etc.

At operation 908, the recommendation module 210 can generate recommendations based at least in part on analyzing the authorization data. In at least one example, based at least in part on analyzing the authorization data using the machine-trained model, the recommendation module 210 can generate recommendations for merchants, potential merchants, or other users of services offered by the service provider. In at least one example, such recommendations can be determined based on identified similarities and/or trends. For example, merchants who are associated with a first merchant classification code can have an average of 15 identification instruments active at a time and can associate authorizations for any operation where funds that were to be collected are no longer collected and/or are returned (e.g., voids, cancellations, refunds, etc.). In at least one example, the recommendation module 210 can generate a recommendation for similar merchants (e.g., merchants that satisfy a similarity threshold) so that the recommendation module 210 can recommend the same number of identification instruments and/or authorizations to the similar merchants. In at least one example, the recommendation module 210 can receive additional authorization data and can train and/or update the machine-trained model over time, for example, as new authorization data is received.

At operation 910, the recommendation module 210 can send recommendation(s) to device(s) of merchant(s). In at least one example, the recommendation module 210 can send recommendations to user computing device(s) of merchant(s). In some examples, recommendation(s) can be sent at a regular frequency, for example, based at least in part on observing how merchants are using authorization services provided by the service provider. In at least one example, a recommendation can be sent as an email, a text message, a push notification, an in-app notification, etc. In some examples, recommendation(s) can be sent to user computing device(s) of merchant(s) that are adding authorization services. In some examples, recommendation(s) can be surfaced in marketing materials, via a dashboard, a website, or the like.

FIG. 10 illustrates an example environment 1000. The environment 1000 includes server computing device(s) 1002 that can communicate over a network 1004 with user devices 1006 (which, in some examples can be merchant devices 1008 (individually, 1008(A)-1008(N))) and/or server computing device(s) 1010 associated with third-party service provider(s). The server computing device(s) 1002 can be associated with a service provider 1012 that can provide one or more services for the benefit of users 1014, as described below. Actions attributed to the service provider 1012 can be performed by the server computing device(s) 1002.

In at least one example, entities described in FIG. 10 can correspond to entities described above with reference to FIGS. 1 and 2. For example, the server computing device(s) 1002 can correspond to the server(s) 204, the user device 1006 can correspond to the user computing device 102, and the network(s) 1004 can correspond to the network(s) 205. In at least one example, the service provider 1012 can correspond to the service provider described above.

The environment 1000 can include a plurality of user devices 1006, as described above. Each one of the plurality of user devices 1006 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1014. The users 1014 can be referred to as customers, buyers, merchants, sellers, borrowers, employees, employers, payors, payees, couriers and so on. The users 1014 can interact with the user devices 1006 via user interfaces presented via the user devices 1006. In at least one example, a user interface can be presented via a web browser, or the like. In other examples, a user interface can be presented via an application, such as a mobile application or desktop application, which can be provided by the service provider 1012 or which can be an otherwise dedicated application. In some examples, individual of the user devices 1006 can have an instance or versioned instance of an application, which can be downloaded from an application store, for example, which can present the user interface(s) described herein. In at least one example, the application 104 described above with reference to FIG. 1 can be an instance of such an application. In at least one example, a user 1014 can interact with the user interface via touch input, spoken input, or any other type of input.

As described above, in at least one example, the users 1014 can include merchants 1016 (individually, 1016(A)-1016(N)). In an example, the merchants 1016 can operate respective merchant devices 1008, which can be user devices 1006 configured for use by merchants 1016. For the purpose of this discussion, a "merchant" can be any entity that offers items (e.g., goods or services) for purchase or other means of acquisition (e.g., rent, borrow, barter, etc.). The merchants 1016 can offer items for purchase or other means of acquisition via brick-and-mortar stores, mobile stores (e.g., pop-up shops, food trucks, etc.), online stores, marketplaces, social media platforms, combinations of the foregoing, and so forth. In some examples, at least some of the merchants 1016 can be associated with a same entity but can have different merchant locations and/or can have franchise/franchisee relationships. In additional or alternative examples, the merchants 1016 can be different merchants. That is, in at least one example, the merchant 1016(A) is a different merchant than the merchant 1016(B) and/or the merchant 1016(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

In some examples, a merchant device 1008 can have an instance of a POS application 1018 stored thereon. In at least one example, the application 104 described above with reference to FIG. 1 can be an instance of such an application. The POS application 1018 can configure the merchant device 1008 as a POS terminal, which enables the merchant 1016(A) to interact with one or more customers 1020. As described above, the users 1014 can include customers, such as the customers 1020 shown as interacting with the merchant 1016(A). For the purpose of this discussion, a "customer" can be any entity that acquires items from merchants. While only two customers 1020 are illustrated in FIG. 10, any number of customers 1020 can interact with the merchants 1016. Further, while FIG. 10 illustrates the customers 1020 interacting with the merchant 1016(A), the customers 1020 can interact with any of the merchants 1016. Note, while the merchant device 1008 is described herein as including a POS application 1018, in some examples, the merchant device 1008 may not have a POS application 1018 and the merchant device 1008 can access the payment processing services described herein via an additional or alternative user interface.

As described above, techniques described herein are directed to authorization using POS systems, or components associated therewith. Merchants 1016 often use specially configured POS systems, such as the POS terminal (e.g., the merchant device 1008 and POS application 1018) for processing payments for transactions. In some examples, the specially configured POS systems, or portions thereof, can be provided by the service provider 1012. In an example, a specially configured POS system, described below, can utilize the POS application 1018 that configures a computing device to communicate with a reader device, such as a reader device 1022 which can be coupled to the merchant device 1008. The reader device 1022, which can correspond to the reader device 106 in FIG. 1, can read payment data from payment instruments and transmit the payment data to the POS application 1018. The POS application 1018 can transmit the payment data with transaction data to the server(s) 1002 to process the payment on behalf of a merchant.

In some examples, the reader device 1022 can be configured to read non-payment data in addition to the payment data, as described above. That is, in some examples, the POS application 1018 can send an instruction to the reader device 1022 to configure the reader device 1022 to read non-payment data from an instrument (e.g., a radio-frequency identification (RFID) card, a wearable device, a fob, etc.). Such non-payment data can be used for determining an identity of a user—such as an employee of the merchant—and/or determining which operation(s) the user is authorized to perform. That is, the POS application 1018 can transition between different states to configure the reader device 1022 to read different types of data (e.g., payment data or non-payment data), thereby enabling the merchant to utilize the specifically configured POS system for processing payments and/or authorization. As described above, "authorization" can refer to any process associated with determining an identity of a user, verifying an identity of a user, and/or permitting a user to perform an operation based on identifying and/or verifying the identity of the user.

Techniques described herein enable merchants to use hardware (e.g., the reader device 1022) that is configured to read both payment data (e.g., associated with payment cards or other payment instruments) and non-payment data (e.g., associated with identification cards or other identification instruments). That is, in some examples, techniques described herein enable merchants to use a single reader device (e.g., the reader device 1022) for obtaining different types of data from different types of instruments. As such, techniques described herein offer an improvement to existing technology because fewer devices, and thus resources, are needed to perform access control operations and/or payment processing as described herein. Moreover, techniques described herein offer improvements to verification by offering additional or alternative mechanisms for ensuring that an employee is who they say they are and/or identification by offering additional or alternative mechanisms for an employee to identify themselves in association with an operation.

In some examples, and as described above, to perform techniques described herein, the reader device 1022 can be specially configured to read different types of data. For instance, as described herein, the reader device 1022 can have an antenna that can be configured to service multiple frequency bands (which can correspond to different types of data to be read) or multiple antennas (e.g., the antenna(s) 203, described above with reference to FIG. 2) that can each be configured to service a different frequency band. Further, the reader device 1022 can be configured to receive instructions regarding different types of data to be obtained and can (i) prioritize such instructions and/or (ii) determine how to handle (e.g., encrypt) received data based on the instructions. As such, the reader device 1022 can be configured to read different types of data using different frequency bands, and such data can be transmitted to an application, such as the POS application 1018, for payment processing, authorizations, and the like.

In addition to modifications to existing reader device technologies, techniques described herein can necessitate modifications to traditional payment flows. That is, in existing technologies, when a merchant desires to obtain payment for a transaction, the merchant can interact with a user interface, which can cause a POS application 1018 to prompt the reader device to prepare to read payment data from a payment instrument. Upon receiving the payment data, the reader device 1022 can send the payment data to the POS application 1018 and the POS application 1018 can process payment for the transaction, via a connection with remotely located server(s) 1002. However, techniques described herein enable the POS application 1018 to transition between different states, based on a determination of which type of data is to be obtained (e.g., from different types of instruments), and send different instructions to the reader device 1022 to prompt the reader device 1022 to prepare to read the relevant type of data. That is, the POS application 1018 can utilize a reader device 1022 with different flows to obtain different types of data, which can be associated with different states. In some examples, such modifications cause reader devices to activate at times that reader devices would not otherwise activate (e.g., at some time when a payment flow is not in process or a particular payment user interface is being presented). Such techniques, however, can otherwise be integrated into existing payment flows using existing hardware—both with modifications—to provide secure, scalable authorization mechanisms.

In at least one example, interactions between the customers 1020 and the merchants 1016 that involve the exchange of funds (from the customers 1020) for items (from the merchants 1016) can be referred to as "transactions." In at least one example, the POS application 1018 can determine transaction data associated with the transactions. transaction data can include payment data, which can be obtained from a reader device 1022 associated with the merchant device 1008(A), user authentication data, purchase amount data, point-of-purchase data (e.g., item(s) purchased, date of purchase, time of purchase, etc.), etc. The POS application 1018 can send transaction data to the server computing device(s) 1002. Furthermore, the POS application 1018 can present a user interface to enable the merchant 1016(A) to interact with the POS application 1018 and/or the service provider 1012 via the POS application 1018.

In at least one example, the merchant device 1008(A) can be a special-purpose computing device configured as a POS terminal (via the execution of the POS application 1018). In at least one example, the POS terminal can be connected to a reader device 1022, which is capable of accepting a variety of payment instruments, such as credit cards, debit cards, gift cards, short-range communication based payment instruments (e.g., identification instruments, as described herein), and the like, as described below. In at least one example, the reader device 1022 can plug in to a port in the merchant device 1008(A), such as a microphone port, a headphone port, an audio-jack, a data port, or other suitable port. In additional or alternative examples, the reader device 1022 can be coupled to the merchant device 1008(A) via another wired or wireless connection, such as via a Bluetooth®, Bluetooth® low energy (BLE), and so on. Additional details are described below with reference to FIG. 10. In some examples, the reader device 1022 can read data from alternative payment instruments including, but not limited to, wristbands, wearable devices, fobs, and the like. The reader device 106 described above with reference to FIG. 1 can correspond to the reader device 1022.

In some examples, the reader device 1022 can physically interact with payment instruments such as magnetic stripe payment cards, EMV payment cards, and/or short-range communication (e.g., NFC, radio frequency identification (RFID), Bluetooth®, BLE, etc.) payment instruments (e.g., cards or devices configured for tapping). The POS terminal can provide a rich user interface, communicate with the reader device 1022, and communicate with the server computing device(s) 1002, which can provide, among other services, a payment processing service. The server computing device(s) 1002 associated with the service provider 1012 can communicate with server computing device(s) 1010, as described below. In this manner, the POS terminal and reader device 1022 can collectively process transaction(s) between the merchants 1016 and customers 1020. In some examples, POS terminals and reader devices can be configured in one-to-one pairings. Such a one-to-one pairing is described above with reference to FIG. 3. In other examples, the POS terminals and reader devices can be configured in many-to-one pairings (e.g., one POS terminal coupled to multiple reader devices or multiple POS terminals coupled to one reader device). Such a many-to-one pairing is described above with reference to FIG. 4. In some examples, there could be multiple POS terminal(s) connected to a number of other devices, such as "secondary" terminals, e.g., back-of-the-house systems, printers, line-buster devices, POS readers, and the like, to allow for data from the secondary terminal to be shared between the primary POS terminal(s) and secondary terminal(s), for example via short-range communication technology. This kind of arrangement can also work in an offline-online scenario to allow one device (e.g., secondary terminal) to continue taking user input, and synchronize data with another device (e.g., primary terminal) when the primary or secondary terminal switches to online mode. In other examples, such data synchronization can happen periodically or at randomly selected time intervals.

While, the POS terminal and the reader device 1022 of the POS system 1024 are shown as separate devices, in additional or alternative examples, the POS terminal and the reader device 1022 can be part of a single device. In some examples, the reader device 1022 can have a display integrated therein for presenting data to the customers 1020. In additional or alternative examples, the POS terminal can have a display integrated therein for presenting data to the customers 1020. POS systems, such as the POS system 1024, can be mobile, such that POS terminals and reader devices can process transactions in disparate locations across the world. POS systems can be used for processing card-present transactions and card-not-present (CNP) transactions, as described below.

A card-present transaction is a transaction where both a customer 1020 and his or her payment instrument are physically present at the time of the transaction. Card-present transactions can be processed by swipes, dips, taps, or any other interaction between a physical payment instrument (e.g., a card), or otherwise present payment instrument, and a reader device 1022 whereby the reader device 1022 is able to obtain payment data from the payment instrument. A swipe is a card-present transaction where a customer 1020 slides a card, or other payment instrument, having a magnetic strip through a reader device 1022 that captures payment data contained in the magnetic strip. A dip is a card-present transaction where a customer 1020 inserts a payment instrument having an embedded microchip (i.e., chip) into a reader device 1022 first. The dipped payment instrument remains in the payment reader until the reader device 1022 prompts the customer 1020 to remove the card, or other payment instrument. While the payment instrument is in the reader device 1022, the microchip can create a one-time code which is sent from the POS system 1024 to the server computing device(s) 1010 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1020 can tap or hover his or her payment instrument (e.g., card, electronic device such as a smart phone running a payment application, etc.) over a reader device 1022 to complete a transaction via short-range communication (e.g., NFC, RFID, Bluetooth®, BLE, etc.). Short-range communication enables the payment instrument to exchange data with the reader device 1022. A tap can also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction. In some examples, transactions as described herein are CNP transactions such that the servers computing device(s) 1002 can receive payment data (e.g., from user(s)/customer(s) 1020 via a secure portal that enables the user(s)/customer(s) 1020 to manually input payment data and/or an identifier to enable access to card-on-file data).

The POS system 1024, the server computing device(s) 1002, and/or the server computing device(s) 1010 can exchange payment data and transaction data to determine whether transactions are authorized. For example, the POS system 1024 can provide encrypted payment data, user authentication data, purchase amount data, point-of-purchase data, etc. (collectively, transaction data) to server computing device(s) 1002 over the network(s) 1004. The server computing device(s) 1002 can send the transaction data to the server computing device(s) 1010. As described above, in at least one example, the server computing device(s) 1010 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server computing device(s) 1010 associated therewith) can send a fund transfer request to a server computing device of a card payment network (e.g., Mastercard®, VISA®, etc.) to determine whether the transaction is authorized or deficient. In at least one example, the service provider 1012 can serve as an acquirer and connect directly with the card payment network.

The card payment network (e.g., the server computing device(s) 1010 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server computing device(s) 1010 associated therewith) can make a determination as to whether the customer has the capacity to absorb the relevant charge associated with the payment transaction. In at least one example, the service provider 1012 can serve as an issuer and/or can partner with an issuer. The transaction is either approved or rejected by the issuer and/or the card payment network (e.g., the server computing device(s) 1010 associated therewith), and a payment authorization message is communicated from the issuer to the POS device via a path opposite of that described above, or via an alternate path.

As described above, the server computing device(s) 1010, which can be associated with payment service provider(s), can determine whether payment for the transaction is authorized based on the transaction data, as well as data relating to parties to the transaction (e.g., the customer 1020 and/or the merchant 1016(A)). The server computing device(s) 1010 can send an authorization notification over the network(s) 1004 to the server computing device(s) 1002, which can send the authorization notification to the POS system 1024 over the network(s) 1004 to indicate whether the payment is authorized. The server computing device(s) 1002 can also transmit additional data such as transaction identifiers to the POS system 1024. In one example, the server computing device(s) 1002 can include a payment processing module (e.g., the payment processing module 208 described above with reference to FIG. 2) and/or other functional components for communicating with the POS system 1024 and/or the server computing device(s) 1010 to authorize or decline payments for transaction.

Based on the authentication notification that is received by the POS system 1024 from server computing device(s) 1002, the merchant 1016(A) can indicate to the customer 1020 whether payment for the transaction has been approved. In some examples, approval can be indicated at the POS system 1024, for example, at a display of the POS system 1024. In other examples, such as with a smart phone or watch operating as a short-range communication payment instrument, data about the approved transaction can be provided to the short-range communication payment instrument for presentation via a display of the smart phone or watch. In some examples, additional or alternative data can additionally be presented with the approved payment notification including, but not limited to, receipts, special offers, coupons, or loyalty program data.

The service provider 1012 can provide, among other services, payment processing services, authorization services, inventory management services, catalog management services, business banking services, financing services, lending services, reservation management services, web-development services, payroll services, employee management services, appointment services, loyalty tracking services, restaurant management services, order management services, fulfillment services, peer-to-peer payment services, onboarding services, identity verification (IDV) services, and so on. In some examples, the users 1014 can access all of the services of the service provider 1012. In other examples, the users 1014 can have gradated access to the services, which can be based on risk tolerance, IDV outputs, subscriptions, and so on. In at least one example, access to such services can be availed to the merchants 1016 via the POS application 1018. In additional or alternative examples, each service can be associated with its own access point (e.g., application, web browser, etc.).

The service provider 1012 can offer payment processing services for processing payments on behalf of the merchants 1016, as described above. For example, the service provider 1012 can provision payment processing software, payment processing hardware and/or payment processing services to merchants 1016, as described above, to enable the merchants 1016 to receive payments from the customers 1020 when conducting transactions with the customers 1020. For instance, the service provider 1012 can enable the merchants 1016 to receive cash payments, payment card payments, and/or electronic payments from customers 1020 for transactions and the service provider 1012 can process transactions on behalf of the merchants 1016.

As the service provider 1012 processes transactions on behalf of the merchants 1016, the service provider 1012 can maintain accounts or balances for the merchants 1016 in one or more ledgers. For example, the service provider 1012 can analyze transaction data received for a transaction to determine an amount of funds owed to a merchant 1016(A) for the transaction. In at least one example, such an amount can be a total purchase price less fees charged by the service provider 1012 for providing the payment processing services. Based on determining the amount of funds owed to the merchant 1016(A), the service provider 1012 can deposit funds into an account of the merchant 1016(A). The account can have a stored balance, which can be managed by the service provider 1012. The account can be different from a conventional bank account at least because the stored balance is managed by a ledger of the service provider 1012 and the associated funds are accessible via various withdrawal channels including, but not limited to, scheduled deposit, same-day deposit, instant deposit, and a linked payment instrument.

A scheduled deposit can occur when the service provider 1012 transfers funds associated with a stored balance of the merchant 1016(A) to a bank account of the merchant 1016

(A) that is held at a bank or other financial institution (e.g., associated with the server computing device(s) 1010). Scheduled deposits can occur at a prearranged time after a transaction is funded, which can be a business day after the transaction occurred, or sooner or later. In some examples, the merchant 1016(A) can access funds prior to a scheduled deposit. For instance, the merchant 1016(A) can have access to same-day deposits (e.g., wherein the service provider 1012 deposits funds from the stored balance to a linked bank account of the merchant on a same day as transaction, in some examples prior to the transaction being funded) or instant deposits (e.g., wherein the service provider 1012 deposits funds from the stored balance to a linked bank account of the merchant on demand, such as responsive to a request). Further, in at least one example, the merchant 1016(A) can have a payment instrument that is linked to the stored balance that enables the merchant to access the funds without first transferring the funds from the account managed by the service provider 1012 to the bank account of the merchant 1016(A).

In at least one example, the service provider 1012 can provide authorization services as described above. That is, the service provider 1012 can provide a platform through which operations can be controlled through authorizations and/or permissions. In some examples, such services can be useful for employers (e.g., for monitoring and/or controlling operations of employees), team leaders/managers (e.g., for monitoring and/or controlling operations of team members/reports), etc. As described above, certain operations can require authorization to perform and techniques described herein enable management of such operations and/or authorization.

In at least one example, the service provider 1012 can provide inventory management services. That is, the service provider 1012 can provide inventory tracking and reporting. Inventory management services can enable the merchant 1016(A) to access and manage a database storing data associated with a quantity of each item that the merchant 1016(A) has available (i.e., an inventory). Furthermore, in at least one example, the service provider 1012 can provide catalog management services to enable the merchant 1016 (A) to maintain a catalog, which can be a database storing data associated with items that the merchant 1016(A) has available for acquisition (i.e., catalog management services). In at least one example, the catalog can include a plurality of data items and a data item of the plurality of data items can represent an item that the merchant 1016(A) has available for acquisition. The service provider 1012 can offer recommendations related to pricing of the items, placement of items on the catalog, and multi-party fulfilment of the inventory.

In at least one example, the service provider 1012 can provide business banking services, which allow the merchant 1016(A) to track deposits (from payment processing and/or other sources of funds) into an account of the merchant 1016(A), payroll payments from the account (e.g., payments to employees of the merchant 1016(A)), payments to other merchants (e.g., business-to-business) directly from the account or from a linked debit card, withdrawals made via scheduled deposit and/or instant deposit, etc. Furthermore, the business banking services can enable the merchant 1016(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1016 to visualize their cash flow to track their financial health, set aside money for upcoming obligations (e.g., savings), organize money around goals, etc.

In at least one example, the service provider 1012 can provide financing services and products, such as via business loans, consumer loans, fixed term loans, flexible term loans, and the like. In at least one example, the service provider 1012 can utilize one or more risk signals to determine whether to extend financing offers and/or terms associated with such financing offers.

In at least one example, the service provider 1012 can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider 1012 can offer different types of capital loan products. For instance, in at least one example, the service provider 1012 can offer a daily repayment loan product, wherein a capital loan is repaid daily, for instance, from a portion of transactions processed by the payment processing service on behalf of the borrower. Additionally and/or alternatively, the service provider 1012 can offer a monthly repayment loan product, wherein a capital loan is repaid monthly, for instance, via a debit from a bank account linked to the payment processing service. The credit risk of the merchant can be evaluated using risk models that take into account factors, such as payment volume, credit risk of similarly situated merchants, past transaction history, seasonality, credit history, and so on.

Additionally or alternatively, the service provider 1012 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1016. The service provider 1012 can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider 1012 (e.g., from payments owed to the merchant from payments processed on behalf of the merchant, funds transferred to the merchant, etc.). The service provider 1012 can offer specific financial products, such as payment instruments, tied specifically to the loan products. For example, in one implementation, the service provider 1012 associates capital to a merchant or customer's debit card, where the use of the debit card is defined by the terms of the loan. In some examples, the merchant can only use the debit card for making specific purchases. In other examples, the "installment" associated with the loan product is credited directly via the payment instrument. The payment instrument is thus customized to the loan and/or the parties associated with the loan.

The service provider 1012 can provide web-development services, which enable users 1014 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1016. In at least one example, the service provider 1012 can recommend and/or generate content items to supplement omni-channel presences of the merchants 1016. That is, if a merchant of the merchants 1016 has a web page, the service provider 1012—via the web-development or other services—can recommend and/or generate additional content items to be presented via other channel(s), such as social media, email, etc.

Furthermore, the service provider 1012 can provide payroll services to enable employers to pay employees for work performed on behalf of employers. In at least one example, the service provider 1012 can receive data that includes time worked by an employee (e.g., through imported timecards and/or POS interactions), sales made by the employee, gratuities received by the employee, and so forth. Based on such data, the service provider 1012 can make payroll payments to employee(s) on behalf of an employer via the payroll service. For instance, the service provider 1012 can facilitate the transfer of a total amount to be paid out for the payroll of an employee from the bank of the employer to the bank of the service provider 1012 to be used to make payroll payments. In at least one example, when the funds have been received at the bank of the service provider 1012, the service provider 1012 can pay the employee, such as by check or direct deposit, often a day, a week, or more after when the work was actually performed by the employee. In additional or alternative examples, the service provider 1012 can enable employee(s) to receive payments via same-day or instant deposit based at least in part on risk and/or reliability analyses performed by the service provider 1012.

Moreover, in at least one example, the service provider 1012 can provide employee management services for managing schedules of employees. Further, the service provider 1012 can provide appointment services for enabling users 1014 to set schedules for scheduling appointments and/or users 1014 to schedule appointments.

In some examples, the service provider 1012 can provide restaurant management services to enable users 1014 to make and/or manage reservations, to monitor front-of-house and/or back-of-house operations, and so on. In such examples, the merchant device(s) 1008 and/or server computing device(s) 1002 can be configured to communicate with one or more other computing devices, which can be located in the front-of-house (e.g., POS device(s)) and/or back-of-house (e.g., kitchen display system(s) (KDS)). In at least one example, the service provider 1012 can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider 1012 can provide fulfilment services, which can use couriers for delivery, wherein couriers can travel between multiple locations to provide delivery services, photography services, etc. Couriers can be users 1014 who can travel between locations to perform services for a requesting user 1014 (e.g., deliver items, capture images, etc.). In some examples, the courier can receive compensation from the service provider 1012. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider 1012 can receive requests for courier services, automatically assign the requests to active couriers, and communicate dispatch instructions to couriers via user interface (e.g., application, web browser, or other access point) presented via respective devices 1006.

In some examples, the service provider 1012 can provide omni-channel fulfillment services. For instance, if a customer places an order with a merchant and the merchant cannot fulfill the order because one or more items are out of stock or otherwise unavailable, the service provider 1012 can leverage other merchants and/or sales channels that are part of the platform of the service provider 1012 to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider 1012 can enable conversational commerce via conversational commerce services, which can use one or more machine learning mechanisms to analyze messages exchanged between two or more users 1014, voice inputs into a virtual assistant or the like, to determine intents of user(s) 1014. In some examples, the service provider 1012 can utilize determined intents to automate customer service, offer promotions, provide recommendations, or otherwise interact with customers in real-time. In at least one example, the service provider 1012 can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather data and make purchases.

In at least one example, the service provider 1012 can provide a peer-to-peer payment service that enables peer-to-peer payments between two or more users 1014. In at least one example, the service provider 1012 can communicate with instances of a payment application (or other access point) installed on devices 1006 configured for operation by users 1014. In an example, an instance of the payment application executing on a first device operated by a payor can send a request to the service provider 1012 to transfer an amount of funds (e.g., fiat currency or non-fiat currency such as cryptocurrency, securities, and related assets) from an account of the payor to an account of a payee (e.g., a peer-to-peer payment). The service provider 1012 can facilitate the transfer and can send a notification to an instance of the payment application executing on a second mobile device operated by the payee that the transfer is in process (or has been completed). In some examples, the service provider 1012 can send additional or alternative data to the instances of the payment application (e.g., low balance to the payor, current balance to the payor or the payee, etc.). In some implementations, the payor and/or payee can be identified automatically, e.g., based on context, proximity, prior transaction history, and so on. In other examples, the payee can send a request for funds to the payor prior to the payor initiating the transfer of funds. The funds transferred can be associated with any digital currency type, including, but not limited to, cash, cryptocurrency, etc. In some embodiments, the service provider 1012 funds the request to payee on behalf of the payor, to speed up the transfer process and compensate for any lags that can be attributed to payor's financial network.

In some implementations, the service provider 1012 can trigger the peer-to-peer payment process through identification of a "payment proxy" having a particular syntax. For example, the syntax includes a monetary currency indicator prefixing one or more alphanumeric characters (e.g., $Cash). The currency indicator operates as the tagging mechanism that indicates to a computer system to treat the inputs as a request from the sender to transfer cash, where detection of the syntax (which includes one or more alphanumeric characters tagged by a monetary currency indicator) triggers a transfer of cash. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. The peer-to-peer process can be initiated through a particular application executing on the user devices 1006.

In some embodiments, the peer-to-peer process can be implemented within a forum context. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. The forum can be employed by a content provider to enable users of the forum to interact with one another, (e.g., through creating messages, posting comments, etc.). In some embodiments, "forum" can also refer to an application or webpage of an e-commerce or retail organization that offers products and/or services. Such websites can provide an online "form" to complete before or after the products or services are added to a virtual cart. The online form can include one or more fields to receive user interaction and engagement. Examples include name and other identification of the user, shipping address of the user, etc. Some of these fields can be configured to receive payment data, such as a payment proxy, in lieu of other kinds of payment mechanisms, such as credit cards, debit cards, prepaid cards, gift cards, virtual wallets, etc.

In some embodiments, the peer-to-peer process can be implemented within a communication application context, such as a messaging application context. The term "messaging application," as used here, refers to any messaging application that enables communication between users (e.g., sender and recipient of a message) over a wired or wireless communications network, through use of a communication message. The messaging application can be employed by the service provider 1012. For instance, the service provider 1012 can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1006 (e.g., mobile device or conventional personal computer (PC)) based on instructions transmitted to and from the server computing device(s) 1002 (which, in such an example can be called a "messaging server"). In some instances, the messaging application can include a payment application with messaging capability that enables users of the payment application to communicate with one another. In such instances, the payment application can be executed on the user device 1006 based on instructions transmitted to and from the server computing device(s) 1002 (e.g., the payment service discussed in this description or another payment service that supports payment transactions).

In at least some embodiments, the peer-to-peer process can be implemented within a landing page context. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider 1012 can generate the landing page to enable the recipient to conveniently receive one or more payments from one or more senders. In some embodiments, the personalized location address identifying the landing page is a uniform resource locator (URL) that incorporates the payment proxy. In such embodiments, the landing page is a web page, e.g., www.cash.me/$Cash.

In at least one example, a user 1014 can be new to the service provider 1012 such that the user 1014 that has not registered (e.g., subscribed to receive access to one or more services offered by the service provider) with the service provider 1012. The service provider 1012 can offer onboarding services for registering a potential user 1014 with the service provider 1012. In some examples, onboarding can involve presenting various questions, prompts, and the like to a potential user 1014 to obtain data that can be used to generate a profile for the potential user 1014. In at least one example, the service provider 1012 can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1014 providing all necessary data, the potential user 1014 can be onboarded to the service provider 1012. In such an example, any limited or short-term access to services of the service provider 1012 can be transitioned to more permissive (e.g., less limited) or longer-term access to such services.

The service provider 1012 can be associated with IDV services, which can be used by the service provider 1012 for compliance purposes and/or can be offered as a service, for instance to third-party service providers (e.g., associated with the server computing device(s) 1010). That is, the service provider 1012 can offer IDV services to verify the identity of users 1014 seeking to use or using their services. Authorization requires a customer (or potential customer) to provide data that is used by compliance departments to prove that the data is associated with an identity of a real person or entity. In at least one example, the service provider 1012 can perform services for determining whether identifying data provided by a user 1014 accurately identifies the customer (or potential customer) (i.e., Is the customer who they say they are?).

The service provider 1012 is capable of providing additional or alternative services and the services described above are offered as a sampling of services. In at least one example, the service provider 1012 can exchange data with the server computing device(s) 1010 associated with third-party service providers. Such third-party service providers can provide data that enables the service provider 1012 to provide services, such as those described above. In additional or alternative examples, such third-party service providers can access services of the service provider 1012. That is, in some examples, the third-party service providers can be subscribers, or otherwise access, services of the service provider 1012.

Techniques described herein can be configured to operate in both real-time/online and offline modes. "Online" modes refer to modes when devices are capable of communicating with the service provider 1012 (e.g., the server computing device(s) 1002) and/or the server computing device(s) 1010 via the network(s) 1004. In some examples, the merchant device(s) 1008 are not capable of connecting with the service provider 1012 (e.g., the server computing device(s) 1002) and/or the server computing device(s) 1010, due to a network connectivity issue, for example. In additional or alternative examples, the server computing device(s) 1002 are not capable of communicating with the server computing device(s) 1010 due to network connectivity issue, for example. In such examples, devices can operate in "offline" mode where at least some payment data is stored (e.g., on the merchant device(s) 1008) and/or the server computing device(s) 1002 until connectivity is restored and the payment data can be transmitted to the server computing device(s) 1002 and/or the server computing device(s) 1010 for processing.

In at least one example, the service provider 1012 can be associated with a hub, such as an order hub, an inventory hub, a fulfillment hub and so on, which can enable integration with one or more additional service providers (e.g., associated with the additional server computing device(s) 1010). In some examples, such additional service providers can offer additional or alternative services and the service provider 1012 can provide an interface or other computer-readable instructions to integrate functionality of the service provider 1012 into the one or more additional service providers.

Techniques described herein are directed to services provided via a distributed system of user devices 1006 that are in communication with one or more server computing devices 1002 of the service provider 1012. That is, techniques described herein are directed to a specific implementation—or, a practical application—of utilizing a distributed system of user devices 1006 that are in communication with one or more server computing devices 1002 of the service provider 1012 to perform a variety of services, as described above. The unconventional configuration of the distributed system described herein enables the server computing device(s) 1002 that are remotely-located from end-users (e.g., users 1014) to intelligently offer services based on aggregated data associated with the end-users, such as the users 1014 (e.g., data associated with multiple, different merchants and/or multiple, different customers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider 1012, and those outside of the control of the service provider 1012, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1014 and user devices 1006. Furthermore, such features are changed dynamically based on the profiles of the users involved interacting with the GUIs. As such, techniques described herein are directed to improvements to computing systems.

Figure 11:
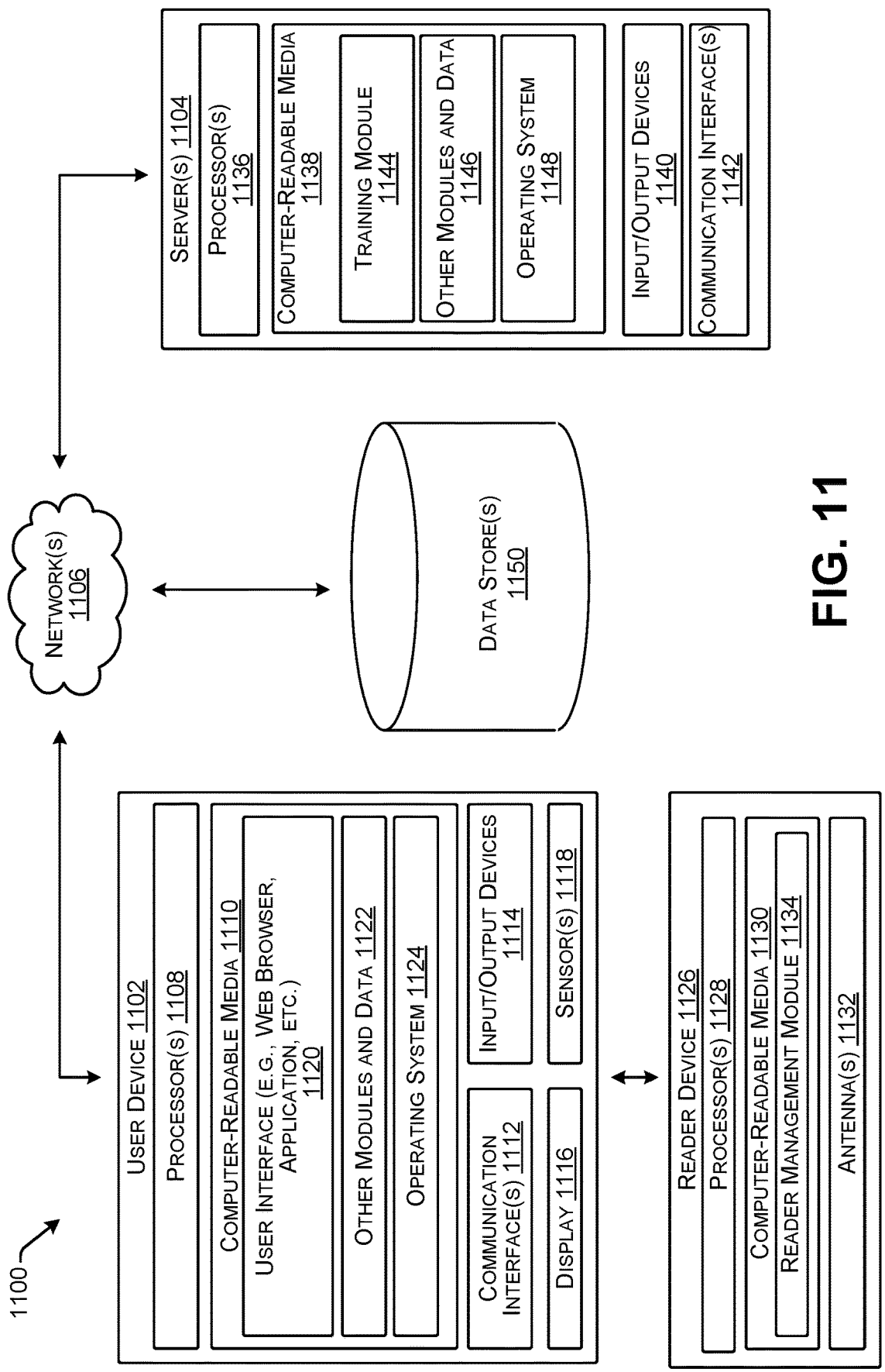
FIG. 11 illustrates additional details associated with individual components of the merchant ecosystem described above in FIG. 10.

FIG. 11 depicts an illustrative block diagram illustrating a system 1100 for performing techniques described herein. The system 1100 includes a user device 1102, that communicates with server computing device(s) (e.g., server(s) 1104) via network(s) 1106 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1102 is illustrated, in additional or alternate examples, the system 1100 can have multiple user devices, as described above with reference to FIG. 9.

In at least one example, entities described in FIG. 11 can correspond to entities described above with reference to FIGS. 1 and 2. For example, the server(s) 1104 can correspond to the server(s) 204, the user device 1102 can correspond to the user computing device 112, and the network(s) 1106 can correspond to the network(s) 205.

Techniques described herein enable merchants to use hardware that is configured to read both payment data (e.g., associated with payment cards or other payment instruments) and non-payment data (e.g., associated with identification cards or other identification instruments). That is, in some examples, techniques described herein enable merchants to use a single reader device, as described below, for obtaining different types of data from different types of instruments and implementing different types of flows based on the different types of data and/or instruments. As such, techniques described herein offer an improvement to existing technology because fewer devices, and thus resources, are needed to perform access control operations and/or payment processing as described herein. Moreover, techniques described herein offer improvements to verification by offering additional or alternative mechanisms for ensuring that an employee is who they say they are and/or identification by offering additional or alternative mechanisms for an employee to identify themselves in association with an operation. Further, techniques described herein can enable authorization flows to be integrated into existing payment flows using existing hardware—both with modifications—to provide secure, scalable authorization mechanisms.

In at least one example, the user device 1102 can be any suitable type of computing device, e.g., portable, semi-portable, semi-stationary, or stationary. Some examples of the user device 1102 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1102 can be any computing device capable of sending communications and performing the functions according to the techniques described herein. The user device 1102 can include devices, e.g., reader devices, or components capable of accepting payments or reading non-payment data, as described below.

In the illustrated example, the user device 1102 includes one or more processors 1108, one or more computer-readable media 1110, one or more communication interface(s) 1112, one or more input/output (I/O) devices 1114, a display 1116, and sensor(s) 1118.

In at least one example, each processor 1108 can itself comprise one or more processors or processing cores. For example, the processor(s) 1108 can be implemented as one or more microprocessors, microcomputers, microcontrollers, digital signal processors, central processing units, state machines, logic circuitries, and/or any devices that manipulate signals based on operational instructions. In some examples, the processor(s) 1108 can be one or more hardware processors and/or logic circuits of any suitable type specifically programmed or configured to execute the algorithms and processes described herein. The processor(s) 1108 can be configured to fetch and execute computer-readable processor-executable instructions stored in the computer-readable media 1110.

Depending on the configuration of the user device 1102, the computer-readable media 1110 can be an example of tangible non-transitory computer storage media and can include volatile and nonvolatile memory and/or removable and non-removable media implemented in any type of technology for storage of data such as computer-readable processor-executable instructions, data structures, program modules or other data. The computer-readable media 1110 can include, but is not limited to, RAM, ROM, EEPROM, flash memory, solid-state storage, magnetic disk storage, optical storage, and/or other computer-readable media technology. Further, in some examples, the user device 1102 can access external storage, such as RAID storage systems, storage arrays, network attached storage, storage area networks, cloud storage, or any other medium that can be used to store data and that can be accessed by the processor(s) 1108 directly or through another computing device or network. Accordingly, the computer-readable media 1110 can be computer storage media able to store instructions, modules or components that can be executed by the processor(s) 1108. Further, when mentioned, non-transitory computer-readable media exclude media such as energy, carrier signals, electromagnetic waves, and signals per se.

The computer-readable media 1110 can be used to store and maintain any number of functional components that are executable by the processor(s) 1108. In some implementations, these functional components comprise instructions or programs that are executable by the processor(s) 1108 and that, when executed, implement operational logic for performing the actions and services attributed above to the user device 1102. Functional components stored in the computer-readable media 1110 can include a user interface 1120 to enable users to interact with the user device 1102, and thus the server(s) 1104 and/or other networked devices. In at least one example, the user interface 1120 can be presented via a web browser, or the like. In other examples, the user interface 1120 can be presented via an application, such as a mobile application or desktop application, which can be provided by a service provider 912 associated with the server(s) 1104, or which can be an otherwise dedicated application. In some examples, the user interface 1120 can be presented via the application 114, described above with reference to FIG. 1. In some examples, user interfaces presented and/or operations performed by the application 114 above can be presented and/or performed by another functional component, such as a web browser or the like. In at least one example, a user can interact with the user interface via touch input, spoken input, gesture, or any other type of input. The word "input" is also used to describe "contextual" input that may not be directly provided by the user via the user interface 1120. For example, user's interactions with the user interface 1120 are analyzed using, e.g., natural language processing techniques, to determine context or intent of the user, which can be treated in a manner similar to "direct" user input.

Depending on the type of the user device 1102, the computer-readable media 1110 can also optionally include other functional components and data, such as other modules and data 1122, which can include programs, drivers, etc., and the data used or generated by the functional components. In addition, the computer-readable media 1110 can also store data, data structures and the like, that are used by the functional components. Further, the user device 1102 can include many other logical, programmatic and physical components, of which those described are merely examples that are related to the discussion herein.

In at least one example, the computer-readable media 1110 can include additional functional components, such as an operating system 1124 for controlling and managing various functions of the user device 1102 and for enabling basic user interactions.

The communication interface(s) 119 can include one or more interfaces and hardware components for enabling communication with various other devices, such as over the network(s) 1106 or directly. For example, communication interface(s) 1112 can enable communication through one or more network(s) 1106, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1106 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure can be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1102 can further include one or more input/output (I/O) devices 1114. The I/O devices 1114 can include speakers, a microphone, a camera, and various user controls (e.g., buttons, a joystick, a keyboard, a keypad, etc.), a haptic output device, and so forth. The I/O devices 1114 can also include attachments that leverage the accessories (audio-jack, USB-C, Bluetooth, etc.) to connect with the user device 1102.

In at least one example, user device 1102 can include a display 1116. Depending on the type of computing device(s) used as the user device 1102, the display 1116 can employ any suitable display technology. For example, the display 1116 can be a liquid crystal display, a plasma display, a light emitting diode display, an OLED (organic light-emitting diode) display, an electronic paper display, or any other suitable type of display able to present digital content thereon. In at least one example, the display 1116 can be an augmented reality display, a virtually reality display, or any other display able to present and/or project digital content. In some examples, the display 1116 can have a touch sensor associated with the display 1116 to provide a touchscreen display configured to receive touch inputs for enabling interaction with a graphic interface presented on the display 1116. Accordingly, implementations herein are not limited to any particular display technology. Alternatively, in some examples, the user device 1102 may not include the display 1116, and data can be presented by other means, such as aurally, hapticly, etc.

In addition, the user device 1102 can include sensor(s) 1118. The sensor(s) 1118 can include a GPS device able to indicate location data. Further, the sensor(s) 1118 can include, but are not limited to, an accelerometer, gyroscope, compass, proximity sensor, camera, microphone, and/or a switch.

In some example, the GPS device can be used to identify a location of a user. In at least one example, the location of the user can be used by the service provider 912, described above, to provide one or more services. That is, in some examples, the service provider 912 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location data availed by the GPS device). In some examples, location can be used for facilitating peer-to-peer payments between nearby users 914 and/or for sending users 914 notifications regarding available appointments with merchant(s) located proximate to the users 914. In at least one example, location can be used for taking payments from nearby customers when they leave a geofence, or location can be used to initiate an action responsive to users 914 enter a brick-and-mortar store of a merchant. Location can be used in additional or alternative ways as well.

Additionally, the user device 1102 can include various other components that are not shown, examples of which include removable storage, a power source, such as a battery and power control unit, a barcode scanner, a printer, a cash drawer, and so forth.

In addition, in some examples, the user device 1102 can include, be connectable to, or otherwise be coupled to a reader device 1126, for reading payment instruments and/or identifiers associated with payment objects. The reader device 106 described above with reference to FIGS. 1 and 2 can correspond to the reader device 1126.

The reader device 1126 can include processor(s) 1128, computer-readable media 1130, and antenna(s) 1132. The processor(s) 1128 of the reader device 1126 can execute one or more modules and/or processes to cause the reader device 1126 to perform a variety of functions, as set forth above and explained in further detail in the disclosure. In some examples, the processor(s) 1128 can include a central processing unit (CPU), a graphics processing unit (GPU), a CPU and a GPU, or processing units or components known in the art. Additionally, each of the processor(s) 1128 can possess its own local memory, which also can store program modules, program data, and/or one or more operating systems. Depending on the exact configuration and type of the reader device 1126, the computer-readable media 1130 can include volatile memory (such as RAM), non-volatile memory (such as ROM, flash memory, miniature hard drive, memory card, or the like), or some combination thereof. In at least one example, the computer-readable media 1130 of the reader device 1126 can include a reader management module 1134 for performing various functions as described herein. The reader management module 1134 can correspond to the reader management module 202, described above with reference to FIG. 2, and can perform operations described above with reference to FIGS. 7 and/or 8.

The reader device 1126 also includes one or more antennas 1132 embedded therein, which can correspond to the antenna(s) 203 described above with reference to FIG. 2. In at least one example, one of the antenna(s) 1132 can be configured to receive payment information from a payment instrument. Additionally, the same antenna, or alternatively a different antenna of the antenna(s) 1132 embedded in the reader device 1126, can inductively couple to an antenna in the non-payment instrument (e.g., RFID instrument or NFC instrument) to obtain user information from the non-payment instrument. That is, the antenna(s) 1132 can include an antenna for reading payment data and/or non-payment data and/or two or more antennas for separately reading payment data and/or non-payment data. The reader device 1126 can operate on low-frequency bands (125 kHz or 134 kHz) high-frequency (HF, 13.56 MHz), and ultra-high-frequency (UHF, 860-960 MHz) through switching between antenna(s) 1132 or by configuring the reader device 1126 in a specific frequency band based on the type of instrument detected at the reader device 1126, or provided as an input through the user interface 1120. For example, the reader device 1126 may leverage lower transmit and receive carrier frequencies to perform wireless communication for non-payment instruments, and higher transmit and receive carrier frequencies for payment instruments, while keeping the same RFID/NFC circuitries.

Similar configurations can be made of the reader is an EMV reader, magnetic stripe reader, biometric reader and so on.

In some examples, the reader device 1126 can include a reader chip, a transaction chip, a timer, a clock, a network interface, a power supply, and so on. The reader chip can perform functionalities to control the operations and processing of the reader device 1126. That is, the reader chip can perform functionalities to control payment interfaces (e.g., a contactless interface, a contact interface, etc.), a wireless communication interface, a wired interface, a user interface (e.g., a signal condition device (FPGA)), etc. Additionally, the reader chip can perform functionality to control the timer, which can provide a timer signal indicating an amount of time that has lapsed following a particular event (e.g., an interaction, a power-down event, etc.). Moreover, the reader chip can perform functionality to control the clock, which can provide a clock signal indicating a time. Furthermore, the reader chip can perform functionality to control the network interface, which can interface with the network(s) 1106, as described below.

Additionally, the reader chip can perform functionality to control the power supply. The power supply can include one or more power supplies such as a physical connection to AC power or a battery. Power supply can include power conversion circuitry for converting AC power and generating a plurality of DC voltages for use by components of reader device 1126. When power supply includes a battery, the battery can be charged via a physical power connection, via inductive charging, or via any other suitable method.

The transaction chip can perform functionalities relating to processing of payment transactions, interfacing with payment instruments, cryptography, and other payment-specific functionality. That is, the transaction chip can access payment data associated with a payment instrument and can provide the payment data to the user computing device 102, as described above. The payment data can include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration date associated with the payment instrument, a primary account number (PAN) corresponding to the customer (which may or may not match the number associated with the instrument), restrictions on what types of charges/debts can be made, etc. Additionally, the transaction chip can encrypt the payment data upon receiving the payment data.

In at least one example, the transaction chip can additionally perform functionalities relating to interfacing with non-payment instruments (e.g., identification instruments), cryptography, and other functionality. That is, the transaction chip can access non-payment data associated with an identification instrument and can provide the non-payment data to the user computing device 102, as described above. The non-payment data can include, but is not limited to, an identifier associated with the identification instrument. Additionally, the transaction chip can encrypt the non-payment data upon receiving the non-payment data.

It should be understood that in some examples, the reader chip can have its own processing unit(s) and computer-readable media and/or the transaction chip can have its own processing unit(s) and computer-readable media. In other examples, the functionalities of reader chip and transaction chip can be embodied in a single chip or a plurality of chips, each including any suitable combination of processing units and computer-readable media to collectively perform the functionalities of the reader chip and transaction chip as described herein.

While, the user device 1102, which can be a POS terminal, and the reader device 1126 are shown as separate devices, in additional or alternative examples, the user device 1102 and the reader device 1126 can be part of a single device, which can be a battery-operated device. In such an example, components of both the user device 1102 and the reader device 1126 can be associated with the single device. In some examples, the reader device 1126 can have a display integrated therewith, which can be in addition to (or as an alternative of) the display 1116 associated with the user device 1102.

The server(s) 1104 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1104 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1104 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1104 can include one or more processors 1136, one or more computer-readable media 1138, one or more I/O devices 1140, and one or more communication interfaces 1142. Each processor 1136 can be a single processing unit or a number of processing units, and can include single or multiple computing units or multiple processing cores. The processor(s) 1136 can be implemented as one or more microprocessors, microcomputers, microcontrollers, digital signal processors, central processing units, state machines, logic circuitries, and/or any devices that manipulate signals based on operational instructions. For example, the processor(s) 1136 can be one or more hardware processors and/or logic circuits of any suitable type specifically programmed or configured to execute the algorithms and processes described herein. The processor(s) 1136 can be configured to fetch and execute computer-readable instructions stored in the computer-readable media 1138, which can program the processor(s) 1136 to perform the functions described herein.

The computer-readable media 1138 can include volatile and nonvolatile memory and/or removable and non-removable media implemented in any type of technology for storage of data, such as computer-readable instructions, data structures, program modules, or other data. Such computer-readable media 1138 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 1104, the computer-readable media 1138 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1138 can be used to store any number of functional components that are executable by the processor(s) 1136. In many implementations, these functional components comprise instructions or programs that are executable by the processors 1136 and that, when executed, specifically configure the one or more processors 1136 to perform the actions attributed above to the service provider 912 and/or payment processing service. Functional components stored in the computer-readable media 1138 can optionally include a training module 1144 and one or more other modules and data 1146.

The training module 1144 can be configured to train models using machine-learning mechanisms, such as the machine-trained model described above with reference to FIG. 8. For example, a machine-learning mechanism can analyze training data to train a data model (e.g., a machine-trained model) that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1102 and/or the server(s) 1104 for use at a time after the data models have been trained (e.g., at runtime).

In at least one example, the one or more other modules and data 1146 can include the authorization module 206, the payment processing module 208, and the recommendation module 210, the functionality of which is described, at least partially, above. Further, the one or more other modules and data 1146 can include programs, drivers, etc., and the data used or generated by the functional components. Further, the server(s) 1104 can include many other logical, programmatic and physical components, of which those described above are merely examples that are related to the discussion herein.

The one or more "modules" referenced herein can be implemented as more modules or as fewer modules, and functions described for the modules can be redistributed depending on the details of the implementation. The term "module," as used herein, refers broadly to software stored on non-transitory storage medium (e.g., volatile or non-volatile memory for a computing device), hardware, or firmware (or any combination thereof) modules. Modules are typically functional such that they that can generate useful data or other output using specified input(s). A module can or may not be self-contained. An application program (also called an "application") can include one or more modules, or a module can include one or more application programs that can be accessed over a network or downloaded as software onto a device (e.g., executable code causing the device to perform an action). An application program (also called an "application") can include one or more modules, or a module can include one or more application programs. In additional and/or alternative examples, the module(s) can be implemented as computer-readable instructions, various data structures, and so forth via at least one processing unit to configure the computing device(s) described herein to execute instructions and to perform operations as described herein.

In some examples, a module can include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1138 can additionally include an operating system 1148 for controlling and managing various functions of the server(s) 1104.

The communication interface(s) 1142 can include one or more interfaces and hardware components for enabling communication with various other devices, such as over the network(s) 1106 or directly. For example, communication interface(s) 1142 can enable communication through one or more network(s) 1106, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1106 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1104 can further be equipped with various I/O devices 1140. Such I/O devices 1140 can include a display, various user interface controls (e.g., buttons, joystick, keyboard, mouse, touch screen, biometric or sensory input devices, etc.), audio speakers, connection ports and so forth.

In at least one example, the system 1100 can include a datastore 1150 that can be configured to store data that is accessible, manageable, and updatable. In some examples, the datastore 1150 can be integrated with the user device 1102 and/or the server(s) 1104. In other examples, as shown in FIG. 11, the datastore 1150 can be located remotely from the server(s) 1104 and can be accessible to the server(s) 1104. The datastore 1150 can comprise multiple databases and/or servers connected locally and/or remotely via the network(s) 1106.

In at least one example, the datastore 1150 can store user profiles, which can include merchant profiles or employee profiles, as described above, customer profiles, and so on.

Customer profiles can store customer data including, but not limited to, customer data (e.g., name, phone number, address, banking data, etc.), customer preferences (e.g., learned or customer-specified), purchase history data (e.g., identifying one or more items purchased (and respective item data), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 1150 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1150 can store additional or alternative types of data as described herein.

In at least one example, the inventory database(s) and/or catalog database(s) can store the catalog and/or inventory records described above. That is, records generated for individual items (e.g., identified as candidate items for resale) can be stored in the datastore 1150. Such records can be associated with item data, as described above.

Moreover, in at least one example, the datastore 1150 can store digital records indicative of transactions processed by a payment processing service associated with the server(s) 1104. Such digital records can offer proof of purchase and can be associated with data including, but not limited to, item(s) sold, item data, a total cost of the transaction, cost(s) of individual item(s), payment data used to satisfy the cost of the transaction, and other data associated with the transaction.

The phrases "in some examples," "according to various examples," "in the examples shown," "in one example," "in other examples," "various examples," "some examples," and the like generally mean the particular feature, structure, or characteristic following the phrase is included in at least one example of the present invention, and can be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to FIGS. 2, 10, and 11 for convenience and ease of understanding. However, the methods illustrated are not limited to being performed using components described in FIGS. 2, 109, and 11, and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

EXAMPLE CLAUSES

A. A computer-implemented method comprising: sending, by a point-of-sale application operating in a first state, a first instruction to a reader device to prepare to read payment data associated with a payment instrument and, responsive to receiving the payment data from the reader device, processing a transaction using the payment data; sending, by the point-of-sale application operating in a second state, a second instruction to the reader device to prepare to read non-payment data associated with an identification instrument of a user and, responsive to receiving the non-payment data from the reader device, at least one of (i) verifying an identity of the user using the non-payment data or (ii) granting the user permission to perform an operation using the non-payment data; and transitioning, by the point-of-sale application, between the first state and the second state based at least in part on a type of instrument to be read by the reader device.

B. The computer-implemented method as clause A recites, further comprising: receiving, by the point-of-sale application, input associated with the transaction, wherein the transaction is between a merchant and a customer; and causing, by the point-of-sale application, a payment graphical user interface to be presented via a display of a computing device on which the point-of-sale application is operable, wherein the first state is associated with the payment graphical user interface.

C. The computer-implemented method as clause A or B recites, further comprising: receiving, by the point-of-sale application, a request to perform the operation, wherein the operation is at least one of a log-in operation, a clock-in operation, an override operation, a refund operation, or a cancel-transaction operation; determining, by the point-of-sale application, that authorization is required to perform the operation; and causing, by the point-of-sale application, an authorization graphical user interface to be presented via a display of a computing device on which the point-of-sale application is operable, wherein the second state is associated with the authorization graphical user interface.

D. The computer-implemented method as any of clauses A-C recites, wherein the non-payment data associated with the identification instrument comprises an identifier unique to the identification instrument, wherein the identifier is associated with the user, and the identifier is stored on a memory chip of the identification instrument.

E. The computer-implemented method as any of clauses A-D recites, wherein the first instruction causes the reader device to activate a first near-field communication (NFC) frequency for reading the payment data and the second instruction causes the reader device to activate a second NFC frequency for reading the non-payment data that is different than the first NFC frequency, and wherein each NFC frequency enables the reader device to establish a unique communication session that is particular to the type of instrument to be read.

F. A computer-implemented method comprising: receiving, via an application executable by a point-of-sale (POS) device, a request for a user to perform an operation on the POS device; requesting, by the application, and prior to permitting the operation, an input to identify the user; sending, from the application and to a reader device associated with the POS device, a first instruction to configure the reader device to prepare to read non-payment data associated with an instrument of a user, wherein the reader device is configurable to read non-payment data and payment data based at least in part on instructions received from the application; receiving, by the application and from the reader device, identification data associated with the instrument of the user; comparing the identification data associated with the instrument with stored user data; and determining whether to permit the operation to be performed based at least in part on the comparing.

G. The computer-implemented method as clause F recites, further comprising: receiving, via the application, input associated with a transaction between a merchant associated with the POS device and a customer; sending, from the application and to the reader device, a second instruction to configure the reader device to prepare to read payment data associated with a payment instrument of the customer; receiving, by the application and from the reader device, the payment data associated with the payment instrument; and sending, from the application, the payment data to one or more servers associated with a service provider, wherein the one or more servers process payment for the transaction using the payment data.

H. The computer-implemented method as clause G recites, wherein the first instruction is sent while the application is associated with a first state and the second instruction is sent while the application is associated with a second state, and wherein the application transitions between the first state and the second state based at least in part on a type of instrument to be read by the reader device.

I. The computer-implemented method as clause G or H recites, wherein the second instruction is sent before the first instruction and, based at least in part on a collision detection and resolution process implemented by the reader device, the identification data is received before the payment data.

J. The computer-implemented method as any of clauses G-I recites, wherein the first instruction causes the reader device to activate a first near-field communication (NFC) frequency for reading the non-payment data and the second instruction causes the reader device to activate a second NFC frequency for reading the payment data that is different than the first NFC frequency, and wherein each NFC frequency enables the reader device to establish a unique communication session that is particular to the type of instrument to be read.

K. The computer-implemented method as any of clauses F-J recites, wherein determining whether to permit the operation to be performed based at least in part the comparing comprises: determining that the identification data corresponds to a user profile of the user; accessing one or more permissions associated with the user profile; and permitting the operation to be performed based at least in part on the one or more permissions.

L. The computer-implemented method as clause K recites, further comprising: receiving the one or more permissions from one or more servers associated with a service provider; and storing the one or more permissions, at least temporarily, to enable the user to perform at least the operation.

M. The computer-implemented method as any of clauses F-L recites, wherein the instrument is associated with at least one of funds received from an employer of the user, loyalty data, or reward data.

N. The computer-implemented method as any of clauses F-M recites, wherein the operation comprises a log-in operation, a clock-in operation, an override operation, a refund operation, or a cancel-transaction operation.

O. A device comprising: one or more processors; and one or more computer-readable media that, when executed by the one or more processors, causes the one or more processors to perform operations comprising: receiving, via an application executable by the device, a request for a user to perform an operation on the device; requesting, by the application, and prior to permitting the operation, an input to identify the user; sending, from the application and to a reader device associated with the device, a first instruction to configure the reader device to prepare to read non-payment data associated with an instrument of a user, wherein the reader device is configurable to read non-payment data and payment data based at least in part on instructions received from the application; receiving, by the application and from the reader device, identification data associated with the instrument of the user; and determining whether to permit the operation to be performed based at least in part on the identification data.

P. The device as clause O recites, the operations further comprising: receiving, via the application, input associated with a transaction between a merchant associated with the device and a customer; sending, from the application and to the reader device, a second instruction to configure the reader device to prepare to read payment data associated with a payment instrument of the customer; receiving, by the application and from the reader device, the payment data associated with the payment instrument; and sending, from the application, the payment data to one or more servers associated with a service provider, wherein the one or more servers process payment for the transaction using the payment data.

Q. The device as clause P recites, wherein the first instruction causes the reader device to activate a first near-field communication (NFC) frequency for reading the non-payment data and the second instruction causes the reader device to activate a second NFC frequency for reading the payment data that is different than the first NFC frequency, and wherein each NFC frequency enables the reader device to establish a unique communication session that is particular to the type of instrument to be read.

R. The device as clause P or Q recites, wherein the first instruction causes the reader device to perform a first encryption process for encrypting the identification data and the second instruction causes the reader device to perform a second encryption process for encrypting the payment data that is different than the first encryption process.

S. The device as any of clauses P-R recites, the operations further comprising: sending, by the application, the identification data to one or more servers associated with a service provider; receiving, by the application and from the one or more servers, an indication of whether the identification data is associated with the user; and determining, by the application, to permit the operation to be performed based at least in part on receiving the indication.

T. The device as any of clauses P-S recites, the operations further comprising: comparing, by the application, the identification data with stored user data; determining, by the application and based at least in part on the comparing, that the identification data is associated with the user; and determining, by the application, to permit the operation to be performed based at least in part on the identification data being associated with the user and one or more permissions associated with a user profile of the user.

While the example clauses described above are described with respect to one particular implementation, it should be understood that, in the context of this document, the content of the example clauses can also be implemented via a method, device, system, a computer-readable medium, and/or another implementation. Additionally, any of example clauses A-T may be implemented alone or in combination with any other one or more of the example clauses A-T.

What is claimed is:

1. A computer-implemented method comprising:
receiving, via an application executing on a point-of-sale (POS) device and from a reader device associated with the POS device while the reader device is configured to read payment data from a payment instrument, an indication of engagement of a non-payment instrument with the reader device;
responsive at least in part to receiving the indication of the engagement, sending, from the application and to the reader device, a first instruction to configure the reader device to read non-payment data;
receiving, by the application and from the reader device, non-payment data comprising identification data of a user associated with the non-payment instrument;
comparing the identification data with stored user data; and
permitting performance by the user of an operation on the POS device based at least in part on the comparing.

2. The computer-implemented method as claim 1 recites, further comprising:
receiving, via the application, input associated with a transaction between a merchant associated with the POS device and a customer;
sending, from the application and to the reader device, a second instruction to configure the reader device to prepare to read payment data associated with a payment instrument of the customer;
receiving, by the application and from the reader device, the payment data associated with the payment instrument; and
sending, from the application, the payment data to one or more servers associated with a service provider, wherein the one or more servers process payment for the transaction using the payment data.

3. The computer-implemented method as claim 2 recites, wherein the first instruction is sent while the application is associated with a first state and the second instruction is sent while the application is associated with a second state, and wherein the application transitions between the first state and the second state based at least in part on a type of instrument to be read by the reader device.

4. The computer-implemented method as claim 2 recites, wherein the second instruction is sent before the first instruction and, based at least in part on a collision detection and resolution process implemented by the reader device, the identification data is received before the payment data.

5. The computer-implemented method as claim 2 recites, wherein the first instruction causes the reader device to activate a first near-field communication (NFC) frequency for reading the non-payment data and the second instruction causes the reader device to activate a second NFC frequency for reading the payment data that is different than the first NFC frequency, and wherein each NFC frequency enables the reader device to establish a unique communication session that is particular to a type of instrument to be read.

6. The computer-implemented method as claim 1 recites, wherein permitting the performance of the operation based at least in part on the comparing comprises:
determining that the identification data corresponds to a user profile of the user;
accessing one or more permissions associated with the user profile; and
permitting the performance of the operation based at least in part on the one or more permissions.

7. The computer-implemented method as claim 6 recites, further comprising:
receiving the one or more permissions from one or more servers associated with a service provider; and
storing the one or more permissions, at least temporarily, to enable the user to perform at least the operation.

8. The computer-implemented method as claim 1 recites, wherein the non-payment instrument is associated with at least one of funds received from an employer of the user, loyalty data, or reward data.

9. The computer-implemented method as claim 1 recites, wherein the operation comprises a log-in operation, a clock-in operation, an override operation, a refund operation, or a cancel-transaction operation.

10. A device comprising:
one or more processors; and
one or more computer-readable media that, when executed by the one or more processors, causes the one or more processors to perform acts comprising:
receiving, via an application executing on the device and from a reader device associated with the device while the reader device is configured to read payment data from a payment instrument, an indication of engagement of a non-payment instrument with the reader device;
responsive at least in part to receiving the indication of the engagement, sending, from the application and to the reader device, a first instruction to configure the reader device to read non-payment data;
receiving, by the application and from the reader device, non-payment data comprising identification data of a user associated with the non-payment instrument; and
permitting performance by the user of an operation on the device based at least in part on the identification data.

11. The device as claim 10 recites, the acts further comprising:
receiving, via the application, input associated with a transaction between a merchant associated with the device and a customer;
sending, from the application and to the reader device, a second instruction to configure the reader device to prepare to read payment data associated with a payment instrument of the customer;

receiving, by the application and from the reader device, the payment data associated with the payment instrument; and sending, from the application, the payment data to one or more servers associated with a service provider, wherein the one or more servers process payment for the transaction using the payment data.

12. The device as claim 11 recites, wherein the first instruction causes the reader device to activate a first near-field communication (NFC) frequency for reading the non-payment data and the second instruction causes the reader device to activate a second NFC frequency for reading the payment data that is different than the first NFC frequency, and wherein each NFC frequency enables the reader device to establish a unique communication session that is particular to a type of instrument to be read.

13. The device as claim 11 recites, wherein the first instruction causes the reader device to perform a first encryption process for encrypting the identification data and the second instruction causes the reader device to perform a second encryption process for encrypting the payment data that is different than the first encryption process.

14. The device as claim 10 recites, the acts further comprising:

sending, by the application, the identification data to one or more servers associated with a service provider;

receiving, by the application and from the one or more servers, an indication of that the identification data is associated with the user; and determining, by the application, to permit the performance of the operation based at least in part on receiving the indication that the identification data is associated with the user.

15. The device as claim 11 recites, the acts further comprising:

comparing, by the application, the identification data with stored user data;

determining, by the application and based at least in part on the comparing, that the identification data is associated with the user; and determining, by the application, to permit the performance of the operation based at least in part on the identification data being associated with the user and one or more permissions associated with a user profile of the user.

16. One or more non-transitory computer-readable media maintaining instructions that, when executed by one or more processors associated with a point-of-sale (POS) device, program the one or more processors to:

receive, via an application executing on the POS device and from a reader device associated with the POS device while the reader device is configured to read payment data from a payment instrument, an indication of engagement of a non-payment instrument with the reader device;

responsive at least in part to receiving the indication of the engagement, send, from the application and to the reader device, a first instruction to configure the reader device to read non-payment data;

receive, by the application and from the reader device, non-payment data comprising identification data of a user associated with the non-payment instrument;

compare the identification data with stored user data; and permitting performance by the user of an operation on the POS device based at least in part on the comparing.

17. The one or more non-transitory computer-readable media of claim 16, wherein permitting the performance of the operation based at least in part on the comparing comprises:

determine that the identification data corresponds to a user profile of the user;

access one or more permissions associated with the user profile; and permit the performance of the operation based at least in part on the one or more permissions.

18. The one or more non-transitory computer-readable media of claim 17, wherein the non-payment instrument is associated with at least one of funds received from an employer of the user, loyalty data, or reward data.

19. The one or more non-transitory computer-readable media of claim 17, wherein the operation comprises a log-in operation, a clock-in operation, an override operation, a refund operation, or a cancel-transaction operation.

20. The one or more non-transitory computer-readable media of claim 17, wherein the instructions further program the one or more processors to:

send, by the application, the identification data to one or more servers associated with a service provider;

receive, by the application and from the one or more servers, an indication that the identification data is associated with the user; and determine, by the application, to permit the performance of the operation based at least in part on receiving the indication that the identification data is associated with the user.

* * * * *